(12) United States Patent
Kim et al.

(10) Patent No.: US 12,004,137 B2
(45) Date of Patent: Jun. 4, 2024

(54) METHOD FOR PERFORMING VEHICLE COMMUNICATION AND DEVICE THEREFOR

(71) Applicant: IUCF-HYU (INDUSTRY-UNIVERSITY COOPERATION FOUNDATION HANYANG UNIVERSITY), Seoul (KR)

(72) Inventors: Sun Woo Kim, Seoul (KR); Yong Min Song, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 493 days.

(21) Appl. No.: 17/289,225

(22) PCT Filed: Nov. 1, 2019

(86) PCT No.: PCT/KR2019/014656
§ 371 (c)(1),
(2) Date: Apr. 27, 2021

(87) PCT Pub. No.: WO2020/091486
PCT Pub. Date: May 7, 2020

(65) Prior Publication Data
US 2022/0015139 A1    Jan. 13, 2022

(30) Foreign Application Priority Data

Nov. 1, 2018  (KR) .......................... 10-2018-0132735
Oct. 31, 2019  (KR) .......................... 10-2019-0138210

(51) Int. Cl.
*H04W 4/00* (2018.01)
*H04W 72/0453* (2023.01)
(Continued)

(52) U.S. Cl.
CPC ....... *H04W 72/0453* (2013.01); *H04W 72/20* (2023.01); *H04W 4/40* (2018.02); *H04W 74/008* (2013.01)

(58) Field of Classification Search
None
See application file for complete search history.

(56) References Cited

U.S. PATENT DOCUMENTS 10,154,515 B1 * 12/2018 Oroskar ................ H04L 1/0003
10,624,076 B2    4/2020 Kim et al.
(Continued)

FOREIGN PATENT DOCUMENTS

KR    10-2016-0135735 A    11/2016
KR    10-2017-0051347 A    5/2017
(Continued)

OTHER PUBLICATIONS

International Search Report and Written Opinion issued in PCT Application No. PCT/KR2019/014656. dated Feb. 11, 2020.

*Primary Examiner* — Zewdu A Beyen

(57) ABSTRACT

A method for providing a V2X service in a next generation wireless access technology (New RAT) comprises: receiving sidelink control information transmitted from other terminal through a sidelink control channel; and receiving sidelink data information transmitted by the other terminal on a sidelink data channel configured in the same slot based on the sidelink control information, wherein the sidelink control information and the sidelink data information are
(Continued)

received in N same symbols among 14 symbols constituting the same slot, and the sidelink data information is received in all of the 14 symbols.

12 Claims, 21 Drawing Sheets

(51) Int. Cl.
*H04W 72/20* (2023.01)
*H04W 4/40* (2018.01)
*H04W 74/00* (2009.01)

(56) References Cited

U.S. PATENT DOCUMENTS

| | | |
|---|---|---|
| 10,716,154 B2 | 7/2020 | Feng |
| 10,980,006 B2 | 4/2021 | Agiwal et al. |
| 2022/0337983 A1* | 10/2022 | Wang .................... H04L 5/0053 |

FOREIGN PATENT DOCUMENTS

| | | | |
|---|---|---|---|
| KR | 10-2018-0108589 A | 10/2018 | |
| WO | 2017-011079 A | 1/2017 | |
| WO | WO-2017103662 A1 * | 6/2017 | ........... H04L 1/0026 |
| WO | 2018-175528 A | 9/2018 | |
| WO | WO-2020022752 A1 * | 1/2020 | ........... H04L 1/1812 |

* cited by examiner (a) DMRS location for Rel. 12/13 PSBCH PSCCH/PSSCH (b) DMRS location for V2V PSBCH/PSSCH

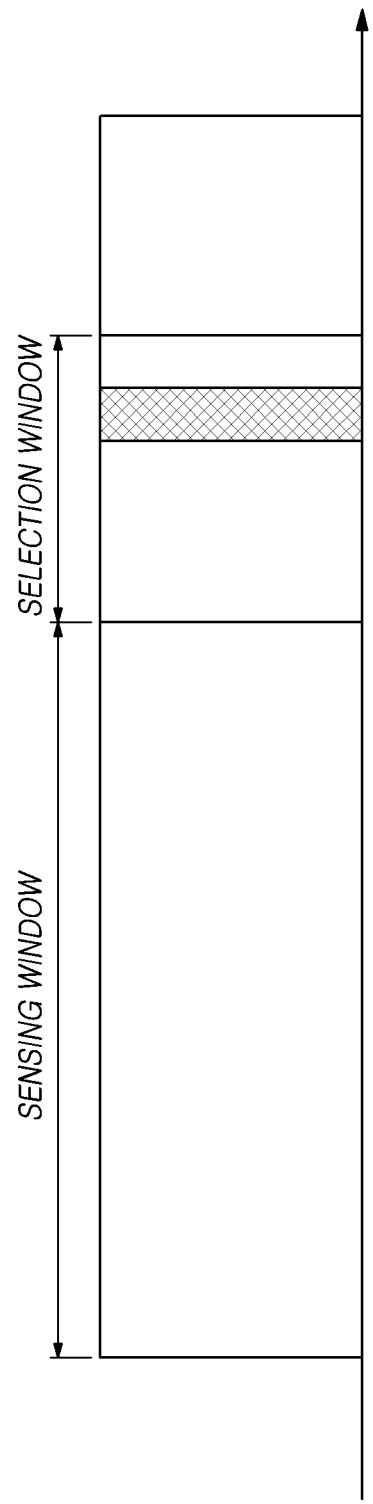

METHOD FOR PERFORMING VEHICLE COMMUNICATION AND DEVICE THEREFOR

CROSS-REFERENCE TO RELATED APPLICATIONS

This application is a National Stage Entry of PCT International Application No. PCT/KR2019/014656, which was filed on Nov. 1, 2019, and which claims priority from and the benefit of Korean Patent Application Nos. 10-2018-0132735, filed on Nov. 1, 2018, and 10-2019-0138210, filed on Oct. 31, 2019, all of which are hereby incorporated by reference for all purposes as if fully set forth herein. In addition, when this application also claims priority for countries other than the United States for the same reason as above, all of the contents of the above-listed applications are hereby incorporated by reference.

TECHNICAL FIELD

The present disclosure relates to a method and a device for providing a vehicle-to-everything (V2X) service in next generation wireless access technology (New RAT).

BACKGROUND ART

There is demand for high-capacity data processing, high-speed data processing, and a variety of services using a wireless terminal in vehicles, industrial sites, and the like. Accordingly, there is demand for technology for high-speed and high-capacity telecommunications systems grown out of simple voice-centric services and able to process a variety of scenarios and high-capacity data, such as images, wireless data, machine-type communication data, and the like.

In this regard, the ITU radiocommunication sector (ITU-R) discloses requirements for the adaptation of international mobile telecommunications-2020 (IMT-2020) international standards. Research into next-generation wireless communication technology for meeting IMT-2020 requirements is underway.

In particular, in the 3rd generation partnership project (3GPP), research into LTE-Advanced Pro Rel-15/16 standards and new radio access technology (NR) standards is underway in order to meet IMT-2020 requirements referred to as 5G technology requirements. The two standard technologies are planned to be approved as next-generation wireless communication technologies.

5G technology may be applied to and used in autonomous vehicles. In this regard, 5G technology needs to be applied to vehicle-to-everything (V2X) communications. For autonomous driving, it is necessary to transmit and receive increasing amounts of data at high speeds with high reliability.

In addition, both unicast data transmission and reception and multicast data transmission and reception using vehicle communications must be provided in order to meet driving scenarios, such as platooning, of a variety of autonomous vehicles.

In particular, in order to compensate for faster data processing and highly reliable processing of a terminal in the vehicle communication, there may be a need to dynamically classify and areas of control information and data information to process them. Accordingly, there may be a need to change the channel structure of communication between terminals and between terminals and base stations in the related art.

DISCLOSURE

Technical Problem

The present embodiments may provide a vehicle communication technology capable of fast and reliable data processing.

Technical Solution

According to an aspect, provided is a method of performing a vehicle communication by a terminal. The method may include: receiving sidelink control information transmitted from other terminal through a sidelink control channel; and receiving sidelink data information transmitted by the other terminal on a sidelink data channel configured in the same slot based on the sidelink control information. The sidelink control information and the sidelink data information may be received in N same symbols among 14 symbols constituting the same slot, and the sidelink data information is received in all of the 14 symbols. The S-SSB may be comprised of a sidelink primary synchronization signal (S-PSS), a sidelink secondary synchronization signal (S-SSS), and a physical sidelink broadcast channel (PSBCH). The S-PSS, the S-SSS, and the PSBCH may be allocated to N number of consecutive symbols in the S-SSB monitoring slot.

According to another aspect, provided is a terminal performing a vehicle communication. The terminal may include: a receiver receiving sidelink control information transmitted from other terminal through a sidelink control channel, and sidelink data information transmitted by the other terminal on a sidelink data channel configured in the same slot based on the sidelink control information; and a controller decoding the sidelink control information and the sidelink data information. The sidelink control information and the sidelink data information may be received in N same symbols among 14 symbols constituting the same slot, and the sidelink data information is received in all of the 14 symbols.

Advantageous Effects

According to the present embodiments, the vehicle communication technology capable of fast and reliable data processing may be provided.

DESCRIPTION OF DRAWINGS

FIGS. 11A and 11B illustrate the type of a V2X transmission resource pools;

BEST MODE

Figure 1:
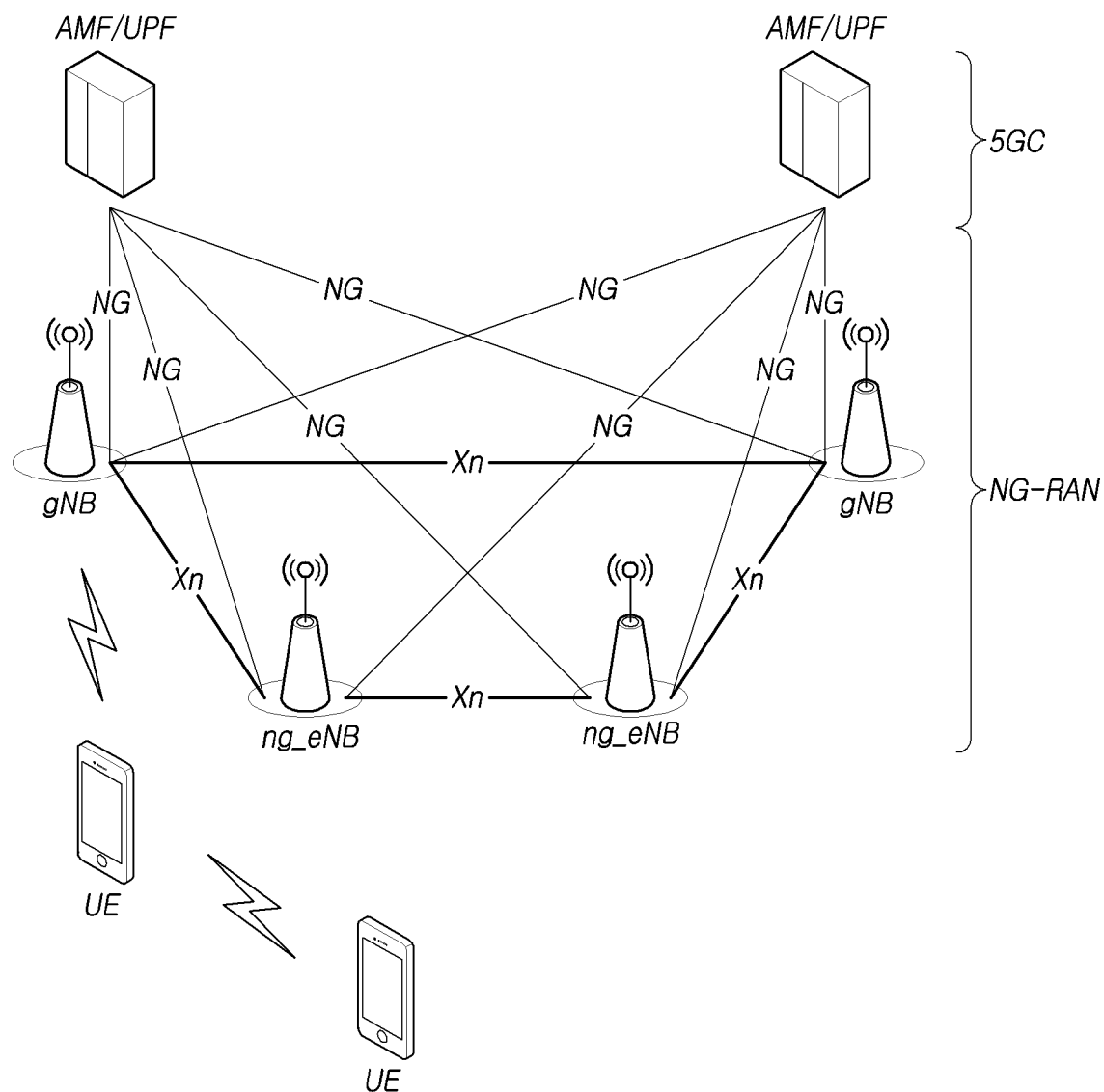
FIG. 1 is a diagram schematically illustrating a structure of an NR wireless communications system to which embodiments are applicable.

Hereinafter, some embodiments of the present disclosure will be described in detail with reference to the accompanying illustrative drawings. In designating elements of the drawings by reference numerals, the same elements will be designated by the same reference numerals although being shown in different drawings. Further, in the following description of the present disclosure, detailed descriptions of known functions and configurations incorporated herein will be omitted in the situation in which the subject matter of the present disclosure may be rendered rather unclear thereby. Terms such as "including", "having", "containing", "constituting", "make up of", and "formed of" as used herein are generally intended to allow other components to be added unless the terms are used with the term "only". As used herein, singular forms are intended to include plural forms unless the context clearly indicates otherwise.

In addition, terms, such as first, second, A, B, (a), (b) or the like may be used herein when describing components of the present disclosure. These terminologies are not used to define an essence, order, sequence, or number of corresponding components but used merely to distinguish the corresponding components from other components.

In the case that it is described that two or more elements are "connected", "coupled", or "linked" to each other, such wording should be interpreted as meaning the two or more elements may not only be directly "connected", "coupled", or "linked" to each other but also be "connected", "coupled", or "linked" to each other via another "intervening" element. Here, the other element may be included in one or more of the two or more elements "connected", "coupled", or "linked" to each other.

When temporally relative terms, such as "after", "subsequent to", "next", "before", and the like, are used to describe processes or operations of elements or configurations, or flows or steps in operating, processing, or manufacturing methods, these terms may be used to describe non-consecutive or non-sequential processes or operations unless the term "directly" or "immediately" is used together.

In addition, when any dimensions, relative sizes, etc. are mentioned, it should be considered that numerical values for elements or features, or corresponding information (e.g. level, range, etc.) include a tolerance or error range that may be caused by various factors (e.g. process factors, internal or external impacts, noise, etc.) even when a relevant description is not specified.

The term "wireless communications system" used herein refers to a system providing a range of communication services, including voice and packet data, using radio resources (or wireless resources). Such a wireless communications system may include a terminal (or user equipment), a base station, a core network, and the like.

Embodiments disclosed hereinafter may be used in wireless communications systems using a range of wireless access technologies. For example, embodiments may be used in a range of wireless access technologies, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). In addition, wireless access technologies may mean not only specific access technologies but also communications technologies according to the generation, established by a variety of communications consultative organizations, such as the 3rd generation partnership project (3GPP), the 3rd generation partnership project 2 (3GPP2), the Wi-Fi alliance, the Bluetooth, the institute of electrical and electronics engineers (IEEE), and the international telecommunication union (ITU). For example, CDMA may be realized by a wireless technology, such as universal terrestrial radio access (UTRA) or CDMA2000. TDMA may be realized by a wireless technology, such as the global system for mobile communications (GSM), General Packet Radio Service (GPRS), or enhanced data rates for GSM evolution (EDGE). OFDMA may be realized by a wireless technology, such as IEEE802.11 (Wi-Fi), IEEE 802.16 (WiMAX), IEEE 802-20, or evolved-UMTS terrestrial radio access (E-UTRA, where UMTS denotes the universal mobile telecommunications system). IEEE 802.16m, evolved from IEEE 802.16e, provides backward compatibility with systems based on IEEE 802.16e. UTRA is a portion of UMTS. 3rd generation partnership project (LTE) long term evolution (3GPP) is a portion of evolved UMTS (E-UMTS) using E-UTRA, and uses OFDMA in downlinks and SC-FDMA in uplinks. In this manner, embodiments of the present disclosure may be used in wireless access technologies that are currently disclosed or commercially available, or may be used in any wireless access technology currently being, or which will be, developed.

In addition, the term "terminal" used herein should be interpreted as having a comprehensive term referring to a wireless communications module that communicates with a base station in a wireless communications system, and should be interpreted as including not only a terminal in wideband code division multiple access (WCDMA), LTE, new radio access technology (NR), HSPA, international mobile telecommunications-2020 (IMT-2020; 5G or New Radio), and the like, but also all of a mobile station (MS), a user terminal (UT), a subscriber station (SS), a wireless device, and the like, used in GSM. In addition, the terminal may refer to a user mobile device, such as a smartphone, depending on the type of use or may refer to a vehicle or a device including a wireless communications module in the vehicle in the vehicle-to-everything (V2X) communications system. Furthermore, in the machine type communications (MTC) system, the terminal may refer to an MTC terminal, a machine-to-machine (M2M) terminal, an ultra-reliability and low latency communications (URLLC) terminal, or the like, provided with a communications module able to perform machine type communications.

The term "base station" or "cell" used herein refers to an end in a network, communicating with the terminal, and comprehensively indicates a variety of coverage areas, such as a node-B, an evolved node-B (eNB), a gNodeB (gNB), a low power node (LPN), a sector, a site, an antenna having a variety of shapes, a base transceiver system (BTS), an access point, a point (e.g. a communication point, a reception point, or a transmission/reception point), a relay node, a megacell, a macrocell, a microcell, a picocell, a femtocell, a remote radio head (RRH), a radio unit (RU), and a small cell. In addition, the cell may be understood as including a bandwidth part (BWP) in a frequency domain. For example, a serving cell may refer to an activation BWP of the terminal.

Since at least one of the variety of cells as stated above is controlled by a dedicated base station, the base station may be interpreted in two senses. Each of the base stations 1) may be an apparatus itself providing a megacell, a macrocell, a microcell, a picocell, a femtocell, or a small cell in relation to a wireless communication area, or 2) may indicate the wireless communication area itself. In 1), when apparatuses providing wireless areas are controlled by the same entity or apparatuses interact with one another to form a wireless area in a coordinated manner, all of such apparatuses may be referred to as base stations. The transmission/reception point, the transmission point, the reception point, and the like are examples of the base station, according to the configuration of the wireless area. In 2), the wireless area itself in which a signal is received or transmitted may be referred to as a base station, from the perspective of a user or an adjacent base station.

The term "cell" used herein may refer to a coverage of a signal transmitted from the transmission point or the transmission/reception point, a component carrier having the coverage of the signal transmitted from transmission point or the transmission/reception point, or the transmission point or the transmission/reception point at which the signal is transmitted.

The term "uplink (UL)" refers to a data transmission/reception method by which data is transmitted from the terminal to the base station, whereas the term "downlink (DL)" refers to a data transmission/reception method by which data is transmitted from the base station to the terminal. The downlink may refer to communications or a communication path from a multiple transmission/reception point to the terminal, whereas the uplink may refer to communications or a communication path from the terminal to the multiple transmission/reception point. In the downlink, a transmitter may be a portion of the multiple transmission/reception point, whereas a receiver may be a portion of the terminal. In addition, in the uplink, the transmitter may be a portion of the terminal, whereas the receiver may be a portion of the multiple transmission/reception point.

The uplink and the downlink transmit and receive control information via a control channel, such as a physical downlink control channel (PDCCH) or a physical uplink control channel (PUCCH), and transmit and receive data by forming a data channel, such as a physical downlink shared channel (PDSCH) or a physical uplink shared channel (PUSCH). Hereinafter, transmitting or receiving a signal via a channel, such as the PUCCH, the PUSCH, the PDCCH, or the PDSCH, may also be described as "transmitting or receiving the PUCCH, the PUSCH, the PDCCH, or the PDSCH".

To clarify the description, the principle of the present disclosure will be described with respect to 3GPP LTE/LTE-A/NR (New RAT) communications system but the technical features of the present disclosure are not limited to the corresponding communications system.

In 3GPP, 5th generation (5G) communications technology for meeting requirements for next generation wireless access technology of the international telecommunication union radiocommunication sector (ITU-R) is developed. Specifically, in 3GPP, research on new NR communications technology separate from LTE advanced Pro (LTE-A Pro) and 4G telecommunications technology improved from LTE Advanced in accordance with the requirements of the ITU-R is developed. Both LTE-A Pro and NR refer to 5G communications technology. Hereinafter, 5G communications technology will be described with respect to NR, except that a particular communications technology is specified.

In NR, a variety of operation scenarios are defined by adding considerations regarding satellites, vehicles, new vertical services, and the like to in typical 4G LTE scenarios. In terms of services, NR supports an enhanced mobile broadband (eMBB) scenario; a massive machine communication (MMTC) scenario having high terminal density, deployed over a wide range, and requiring low data rates and asynchronous accesses; and an ultra-reliability and low latency communications (URLLC) scenario requiring high responsiveness and reliability and able to support high-speed mobility.

In order to meet the scenario described above, NR discloses a wireless communications system using technologies providing a new waveform and frame structure, providing a low latency, supporting ultrahigh frequency waves (mm-Wave), and providing forward compatibility. In particular, the NR system presents various technical changes in terms of flexibility in order to provide forward compatibility. Major technical features of NR will be described hereinafter with reference to the drawings.

<Principle of NR System>

FIG. 1 is a diagram schematically illustrating a structure of an NR wireless communications system to which embodiments of the present disclosure are applicable.

Referring to FIG. 1, the NR system is comprised of a 5G core network (5GC) part and an NR-RAN part. The NG-RAN includes gNBs and ng-eNBs providing protocol ends of a user plane (SDAP/PDCP/RLC/MAC/PHY) and a control plane (or a radio resource control (RRC)) for user equipment UE (or terminal). The gNBs are connected to each other, or the gNBs and the ng-eNBs are connected to each other via an Xn interface. The gNBs and the ng-eNBs are connected to each other via an NG interface in the 5GC. The 5GC may include an access and mobility management function (AMF) managing a control plane, such as terminal access and mobility control, and a user plane function (UPF) managing a control function over user data. The NR system supports both a frequency range of 6 GHz or lower, i.e. frequency range 1 (FR1), and a frequency range of 6 GHz or higher, i.e. frequency range 2 (FR2).

The gNBs refer to base stations providing the NR user plane and control plane protocol ends to the terminal, whereas the ng-eNBs refer to base stations providing evolved UMTS (E-UTRA) user plane and control plane protocol ends to the terminal. The term "base station" used herein should be understood as comprehensively indicating the gNB and the ng-eNB, or may be used as separately indicating the gNB and the ng-eNB as required.

<NR Waveform, Numerology, and Frame Structure>

In NR, cyclic prefix orthogonal frequency-division multiplexing (CP-OFDM) waveforms using the cyclic prefix (CP) for downlink transmissions are used, and CP-OFDM or discrete Fourier transform spread (DFT-s)-OFDM is used for uplink transmissions. The OFDM technology has advantages in that the OFDM technology may be easily combined with a multiple-input multiple-output (MIMO) method, may have a high frequency efficiency, and may use a low-complexity receiver.

In addition, in NR, requirements for data rate, latency, coverage, and the like are different according to the above-described three scenarios. Thus, it is necessary to efficiently meet the requirements according to the scenarios through frequency ranges of the NR system. In this regard, a technology for efficiently multiplexing a plurality of different numerology-based radio resources has been proposed.

Specifically, NR transmission numerology is determined on the basis of subcarrier spacing and the cyclic prefix (CP), and μ values are exponential values of 2 on the basis of 15 kHz and are exponentially changed, as described in Table 1 below.

TABLE 1

| μ | Subcarrier Spacing | Cyclic Prefix | Supported for Data | Supported for Synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As described in Table 1 above, the numerology of NR may be divided into five types according to the subcarrier spacing. This differs from the feature of LTE, i.e. one of 4G communications technologies, in which the subcarrier spacing is fixed to 15 kHz. Specifically, in NR, the subcarrier spacings used for data transmissions are 15, 30, 60, and 120 kHz, and the subcarrier spacings used for synchronous signal transmissions are 15, 30, 12, and 240 kHz. In addition, an extended CP is only applied to 60 kHz subcarrier spacing. On the other hand, the frame structure in NR is defined as a frame having a length of 10 ms comprised of 10 subframes having the same lengths of 10 ms. A single frame may be divided into 5 ms half frames, each of which includes five subframes. In the case of 15 kHz subcarrier spacing, a single subframe comprises a single slot, and each slot comprises fourteen OFDM symbols.

Figure 2:
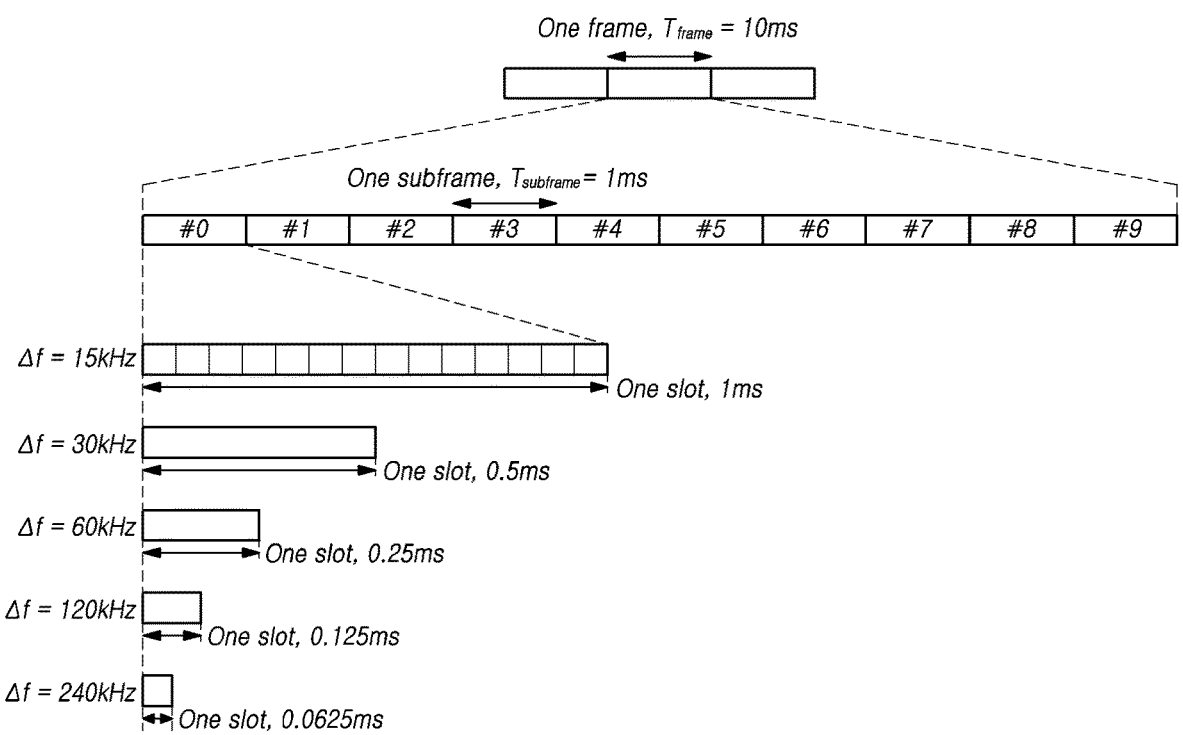
FIG. 2 is a diagram illustrating the frame structure in the NR system to which embodiments of the present disclosure are applicable.

FIG. 2 is a diagram illustrating a frame structure in the NR system to which embodiments of the present disclosure are applicable.

Referring to FIG. 2, the slot is constantly comprised of 14 OFDM symbols in the case of a normal CP, but the length of the slot in the time domain may vary depending on the subcarrier spacing. For example, when the numerology has the 15 kHz subcarrier spacing, the length of the slot is 1 ms, same to that of the subframe. Differently thereto, when the numerology has the 30 kHz subcarrier spacing, the slot may be comprised of 14 OFDM symbols and have 0.5 ms length, such that two slots may be included in a single subframe. That is, each of the subframe and the frame is defined having a fixed time length, and the slot may be defined by the number of symbols, such that the time length may vary depending on the subcarrier spacing.

In addition, in NR, the slot is defined as a basic unit of the scheduling, and a mini-slot (or a sub-slot or a non-slot based schedule) is introduced in order to reduce a transmission delay in a wireless section. When a wide subcarrier spacing is used, the transmission delay in the wireless section may be reduced, since the length of a single slot is shortened in inverse proportion thereto. The mini-slot (or sub-slot) is devised to efficiently support URLLC scenarios and scheduling on the basis of 2, 4, or 7 symbols may be possible.

In addition, unlike LTE, NR defines uplink and downlink resource allocations as symbol levels in a single slot. In order to reduce hybrid automatic repeat request (HARQ) latency, a slot structure able to directly transmit at least one of an HARQ acknowledgement (HARQACK) or an HARQ negative acknowledgement (HARQNACK) in a transmission slot is defined. In the description, this slot structure will be referred to as a self-contained structure.

NR is designed to support a total of 256 slot formats, of which 62 slot formats are used in 3GPP Rel-15. In addition, various slot combinations support a common frame structure including an FDD, or a TDD frame. For example, NR supports a slot structure in which all symbols of the slot are configured as downlinks, a slot structure in which all symbols of the slot are configured as uplinks, and a slot structure in which downlink symbols and uplink symbols are combined. In addition, NR supports a form of scheduling in which data transmission is distributed in one or more slots. Accordingly, the base station may inform the terminal of whether a corresponding slot is a downlink slot, an uplink slot, or a flexible slot, using a slot format indicator (SFI). The base station may indicate a slot format by indicating an index of a table, configured by terminal-specific (UE-specific) RRC signaling, using the SFI, dynamically using downlink control information (DCI), or statically or quasi-statically through the RRC.

<NR Physical Resource>

Regarding the physical resources in NR, antenna ports, resource grids, resource elements (RE), resource blocks, bandwidth parts (BWPs), and the like are considered.

The term "antenna port" is defined such that a channel carrying a symbol on an antenna port may be inferred from a channel carrying another symbol on the same antenna port. When the large-scale property of a channel carrying the symbol on one antenna port is inferable from a channel carrying a symbol on another antenna port, the two antenna ports may be in a quasi co-located or quasi co-location (QC/QCL) relationship. Here, the large-scale property includes at least one of a delay spread, a Doppler spread, a frequency shift, average received power, and received timing.

Figure 3:
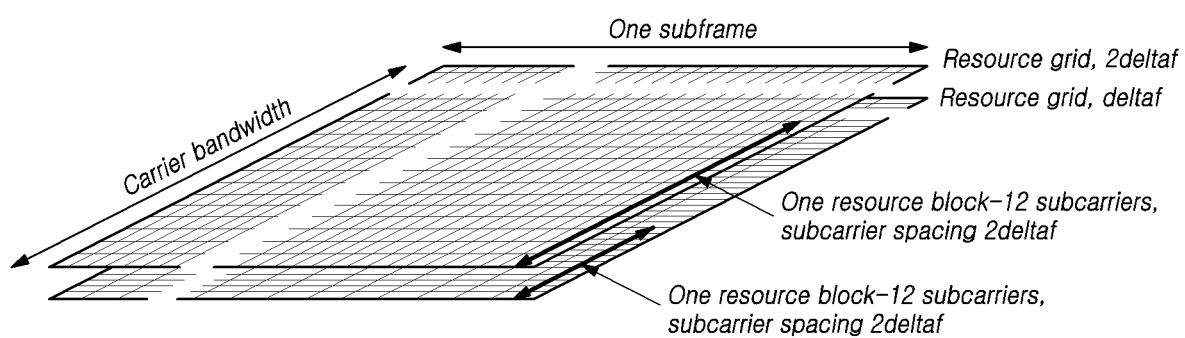
FIG. 3 is a diagram illustrating a resource grid supported by wireless access technology to which embodiments of the present disclosure are applicable.

FIG. 3 is a diagram illustrating a resource grid supported by wireless access technology to which embodiments of the present disclosure are applicable.

Referring to FIG. 3, since NR supports a plurality of numerologies in the same carrier, the resource grid maybe present according to each numerology. In addition, the resource grid may be configured depending on the antenna port, the subcarrier spacing, and the transmission direction.

A resource block is comprised of 12 subcarriers and is only defined in a frequency domain. In addition, a resource element is comprised of one OFDM symbol and one sub-carrier. Therefore, as shown in FIG. 3, the size of one resource block may vary depending on the subcarrier spacing. In addition, NR defines "point A" serving as a common reference point for a resource block grid, a common resource block, and a virtual resource block.

Figure 4:
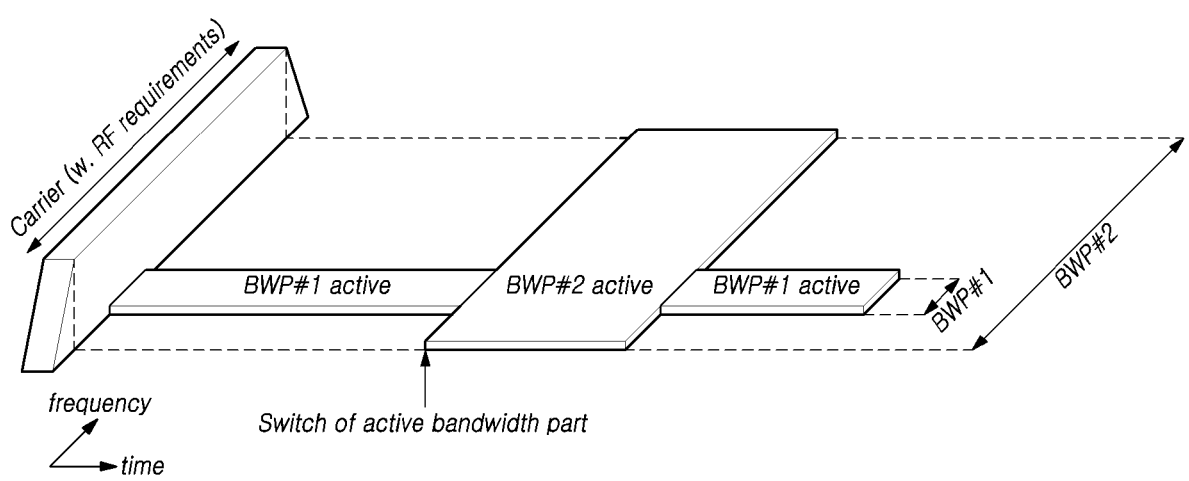
FIG. 4 is a diagram illustrating a bandwidth part (BWP) supported by wireless access technology to which embodiments of the present disclosure are applicable.

FIG. 4 is a diagram illustrating a BWP supported by wireless access technology to which embodiments of the present disclosure are applicable.

In the NR, the maximum carrier bandwidth is configured to be in the range from 50 MHz to 400 MHz depending on the subcarrier spacing, unlike in the LTE with the carrier bandwidth thereof being fixed to 20 MHz. Thus, it is not assumed that all terminals use all of these carrier bandwidths. Accordingly, as illustrated in FIG. 4, in NR, a bandwidth part (BWP) may be designated within a carrier bandwidth so as to be used by the terminal. In addition, the BWP may be associated with one numerology, be comprised of a contiguous subset of the common resource blocks, and be dynamically activated over time. The terminal is provided with up to four BWPs in each of an uplink and a downlink, and transmits and receives data using an activated BWP at a given time.

In the case of a paired spectrum, the uplink and downlink BWPs are configured independently. In the case of an unpaired spectrum, the uplink BWP and the downlink BWP are configured in pairs such that the center frequency may be shared therebetween in order to prevent unnecessary frequency re-tuning between downlink and uplink operations.

<Initial Access of NR>

In NR, the terminal performs cell search and random access procedures to access a base station and performs communications with the base station.

The cell search procedure is a procedure of synchronizing the terminal with the cell of a corresponding base station using asynchronization signal block (SSB) transmitted from the base station, acquiring a physical layer cell identifier (ID), and acquiring system information.

Figure 5:
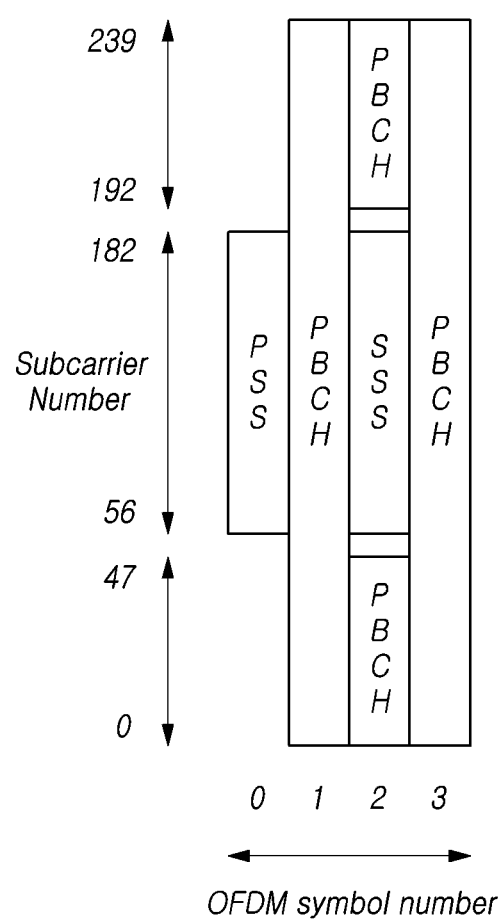
FIG. 5 is a diagram illustrating an example synchronization signal block in wireless access technology to which embodiments of the present disclosure are applicable.

FIG. 5 is a diagram illustrating an example synchronization signal block in wireless access technology to which embodiments of the present disclosure are applicable.

Referring to FIG. 5, an SSB includes a primary synchronization signal (PSS) and a secondary synchronization signal (SSS), each of which occupies one symbol and 127 subcarriers, and a physical broadcast channel (PBCH) covering three OFDM symbols and 240 subcarriers.

The terminal receives the SSB by monitoring the SSB in time and frequency domains.

The SSB may be transmitted up to 64 times for 5 ms. A plurality of SSBs are transmitted on different transmission beams within a period of 5 ms, and the terminal performs detection on the assumption that an SSB is transmitted at every 20 ms period, on the basis of a specific beam used for transmission. The number of beams that may be used for the SSB transmission within the 5 ms period may increase with increases in the frequency range. For example, up to four SSB beams may be transmitted in a frequency range of 3 GHz or lower. SSB may be transmitted using up to eight beams in a frequency range of 3 to 6 GHz and up to 64 different beams in a frequency range of 6 GHz or higher.

Two SSBs are included in one slot, and the start symbol and the number of repetitions in the slot are determined depending on the subcarrier spacing as will be described below.

In addition, unlike an SS of related-art LTE, the SSB is not transmitted at the center frequency of a carrier bandwidth. That is, the SSB may be transmitted on a frequency that is not the center frequency of a system range, and a plurality of SSBs maybe transmitted in a frequency domain when a wideband operation is supported. Thus, the terminal monitors the SSBs using a synchronization raster that is a candidate frequency position for the monitoring of the SSBs. A carrier raster and the synchronous raster, which are center frequency position information of a channel for initial access, are newly defined in NR. The synchronous raster is configured to have a wider frequency interval than the carrier raster, and thus, may support the terminal for rapid SSB search.

The terminal may acquire a master information block (MIB) through the PBCH of the SSB. The MIB includes minimum information by which the terminal receives remaining minimum system information (RMSI) broadcast by the network. In addition, the PBCH may include information regarding the position of a first demodulation reference signal (DM-RS) symbol in the time domain, information (e.g. system information block 1 (SIB1) numerology information, information regarding an SIB1 control resource set (SIB1 CORESET), search space information, or PDCCH related parameter information) by which the terminal monitors SIB1, information regarding an offset between a common resource block and an SSB (where the absolute position of the SSB in the carrier is transmitted via SIB1), and the like. Here, the SIB1 numerology information is equally applied to some messages used in a random access procedure for accessing a base station after the terminal has completed the cell search procedure. For example, the SIB1 numerology information may be applied to at least one of messages 1 to 4 for the random access procedure.

The above-described RMSI may refer to system information block 1 (SIB1), which is periodically broadcast (e.g. at 160 ms) in the cell. SIB1 includes information necessary for the terminal to perform an initial random access procedure and is periodically transmitted through the PDSCH. In order for the terminal to receive SIB1, the terminal is required to receive numerology information, which is used for SIB1 transmission, and control resource set (CORESET) information, which is used for SIB1 scheduling, through the PBCH. The terminal checks scheduling information regarding SIB1 using a system information radio network temporary identifier (SI-RNTI) in the CORESET, and acquires SIB1 on the PDSCH according to the scheduling information. The remaining SIBs other than SIB1 may be periodically transmitted or may be transmitted at the request of the terminal.

Figure 6:
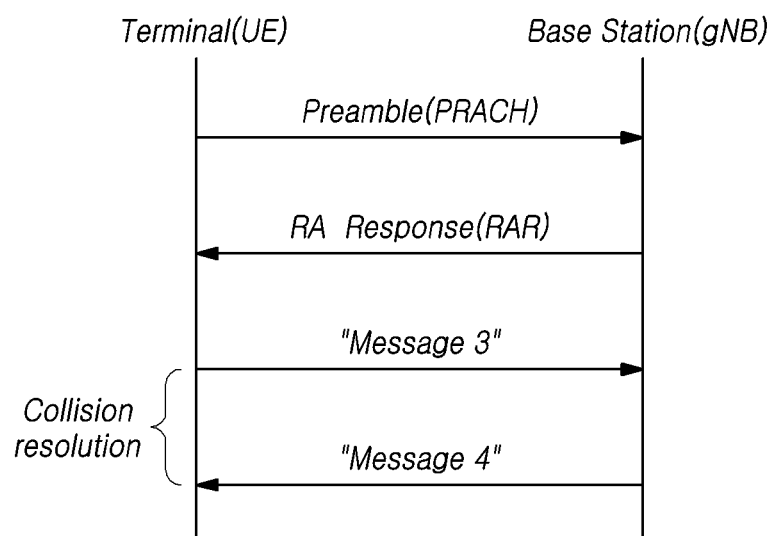
FIG. 6 is a diagram illustrating a random access procedure in wireless access technology to which embodiments of the present disclosure are applicable.

FIG. 6 is a diagram illustrating a random access procedure in wireless access technology to which embodiments of the present disclosure are applicable.

Referring to FIG. 6, when cell search is completed, the terminal transmits a random access preamble, in use for random access, to the base station. The random access preamble is transmitted through a physical random access channel (PRACH). Specifically, the random access preamble is transmitted to the base station through the PRACH comprised of consecutive radio resources in a predetermined slot periodically repeated. In general, a contention-based random access procedure is performed when terminal initially accesses a cell, whereas a non-contention based random access procedure is performed when random access is performed for beam failure recovery (BFR).

The terminal receives a random access response to the transmitted random access preamble. The random access response may include a random access preamble identifier (ID), an uplink (UL) radio resource grant, a temporary cell radio network temporary ID (temporary C-RNTI), and a time alignment command (TAC). Since one random access response may include random access response information regarding one or more sets of terminal, the random access preamble ID may be included in order to indicate to which terminal the included UL grant, the temporary C-RNTI, and the TAC are valid. The random access preamble ID may be an ID of the random access preamble that the base station has received. The TAC may be included as information by which the terminal adjusts uplink synchronization. The random access response may be indicated by a random access ID on the PDCCH, i.e., a random access-radio network temporary ID (RA-RNTI).

When the valid random access response is received, the terminal processes information included in the random access response and performs a scheduled transmission to the base station. For example, the terminal applies the TAC and stores the temporary C-RNTI. In addition, the terminal transmits data stored in a buffer or newly generated data to the base station, using the UL grant. In this case, information by which the terminal may be identified must be included.

Finally, the terminal receives a downlink message for contention resolution.

<NR CORESET>

In NR, a downlink control channel is transmitted on a control resource set (CORESET) having a length of 1 to 3 symbols. Up/down scheduling information, slot format index (SFI) information, transmit power control information, and the like are transmitted through the downlink control channel.

Thus, in NR, in order to secure the flexibility of the system, the CORESET is introduced. The control resource set (CORESET) refers to a time-frequency resource for a downlink control signal. The terminal may decode a control channel candidate using one or more search spaces in a CORESET time-frequency resource. Quasi colocation (QCL) assumption is established according to the CORESET. The QCL assumption is used in order to inform the characteristics of analogue beam directions in addition to characteristics assumed by related-art QCL, such as a delayed spread, a Doppler spread, a Doppler shift, or an average delay.

Figure 7:
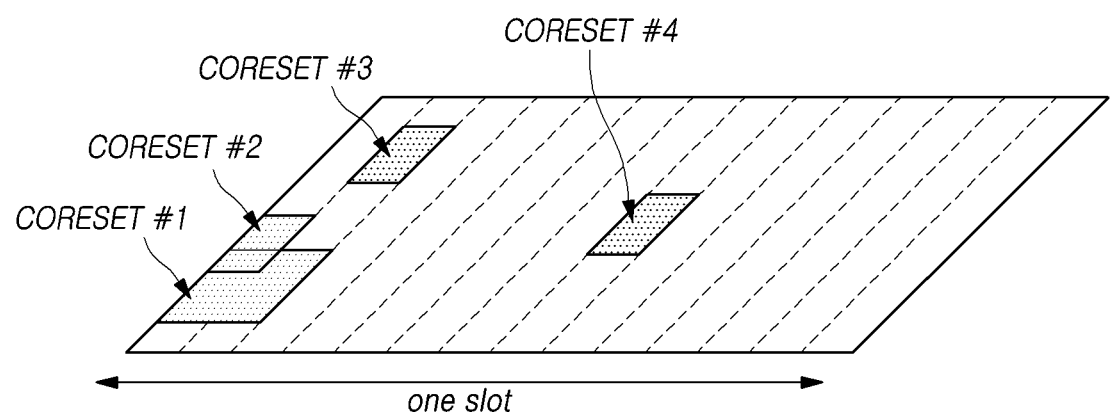
FIG. 7 is a diagram illustrating a CORESET.

FIG. 7 is a diagram illustrating a CORESET.

Referring to FIG. 7, the CORESET may have a variety of forms within a carrier bandwidth in a single slot. The CORESET may be comprised of up to three OFDM symbols in the time domain. In addition, the CORESET is defined as a multiple of six resource blocks up to the carrier bandwidth in the frequency domain.

The first CORESET is a portion of an initial BWP configuration, indicated through the MIB so as to be able to receive additional configuration information and system information from the network. After a connection to the base station is established, the terminal may receive and configure one or more pieces of CORESET information by RRC signaling.

Herein, terms, such as frequency, frame, subframe, resource, resource block, region, band, sub-band, control channel, data channel, synchronization signal, various reference signals, various signals, or various messages, related to new radio access technology (NR) may be interpreted as having a variety of meanings related to concepts used in the past or present or which will be used in the future.

<LTE Sidelink>

In existing LTE systems, wireless channels and wireless protocols have been designed for direct (i.e. sidelink) communications between terminals in order to provide direct terminal-to-terminal communications and V2X (in particular, V2V) services.

Regarding the sidelink, synchronization signals, e.g. a sidelink primary synchronization signal (S-PSS) and a sideline secondary synchronization signal (S-SSS), for synchronization between a transmission port and a receiver port of the wireless sidelink and a physical sidelink broadcasting channel (PSBCH) for the transmission and reception of a related sidelink master information block (MIB) are defined. In addition, a physical sidelink discovery channel (PSDCH) for transmission and reception of discovery information, a physical sidelink control channel (PSCCH) for transmission and reception of sidelink control information (SCI), and a physical sidelink shared channel (PSSCH) for transmission and reception of sidelink data are designed.

In addition, technological developments, made for wireless resource allocation (or radio resource allocation) for the sidelink, have been divided into Mode 1, in which the base station allocates wireless resources and Mode 2, in which the terminal performs allocation by selecting a wireless resource pool. In addition, the LTE system requires additional technological evolution in order to meet V2X scenarios.

In this environment, the 3GPP has deduced 27 service scenarios related to the recognition of a vehicle in the Rel-14 and determined major performance requirements according to road situations. In addition, in the Rel-15, six performance requirements are determined by deducing more advanced 25 service scenarios, such as platooning, advanced driving, and long-distance vehicle sensing.

In order to meet such performance requirements, technical development has been carried out to improve the performance of conventional sidelink technology developed on the basis of D2D communications to comply with the V2X requirements. In particular, for application to the cellular-V2X (C-V2X), a technology for improving a physical sidelink layer design to comply with a high-speed environment, a resource allocation technology, and a synchronization technology may be selected as major research technologies.

The sidelink to be described hereinafter may be construed as comprehensively including links used in D2D communications developed after 3GPP Rel-12, V2X communications after the Rel-14, and the NR V2X after the Rel-15. In addition, respective terms related to channels, synchronization, resources, and the like will be described as being the same terms irrespective of the D2D communications requirements or the V2X Rel-14/15 requirements. However, for a better understanding, features of the sidelink meeting the V2X scenario requirements, different from the sidelink for D2D communications in the Rel-12/13, will mainly be described. Therefore, the terms related to the sidelink to be described hereinafter are merely intended to describe D2D communications, V2X communications, and C-V2X communications in a discriminative manner in order to compare differences thereof and assist in the understanding thereof, but are not applied to a specific scenario in a limitative manner.

For the V2X communication, in order to improve channel estimation performance and frequency offset estimation performance, it is necessary to allocate more pilot signals such as demodulation reference signals (DMRS) than D2D communication.

Figure 8:
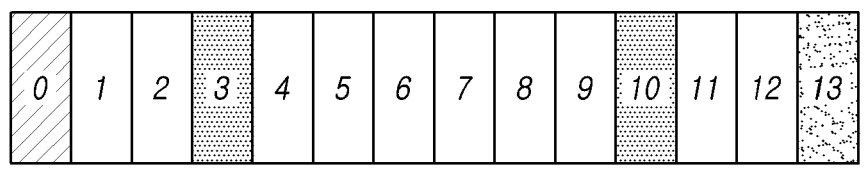
FIG. 8 is a diagram illustrating a related-art 1 DMRS structure for a sidelink and a DMRS structure for the sidelink to which the present embodiment may be applied.
Figure 8:
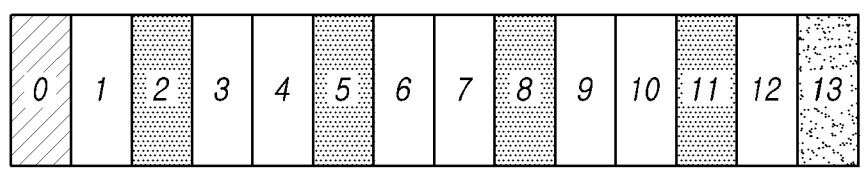
Figure 8:

FIG. 8 is a diagram illustrating a related art DMRS structure for a sidelink and a DMRS structure for a sidelink to which the present embodiment may be applied.

Referring to FIG. 8, two related art (Rel-12/13) DMRSs are allocated per subframe of PSCCH, PSSCH, and PSBCH, and the interval between DMRSs is 0.5 ms. The C-V2X terminal uses the 6 GHz center frequency band defined for sidelink transmission, and the vehicle terminal moves at 280 km/h in consideration of the relative speed. At this time, the correlation time is 0.277 ms, and since this value is shorter than the interval between the reference signals of Rel-12/13, the channel estimation time is insufficient. To solve this problem, in the sidelink for the V2X communication, the number of DMRSs per subframe was increased to 4 and the spacing between reference signals was reduced to 0.214 ms, so that the design of the physical layer was changed to facilitate channel estimation even with rapid channel changes.

Meanwhile, one example of a method of selecting a DMRS symbol pattern is that in a dedicated carrier, the PSCCH/PSSCH allocates the DMRS to the 2/5/8/11 OFDM symbol, and the PSBCH allocates the DMRS to the 3/5/8/10 OFDM symbol. In the 2 GHz band, the Rel-12/13 method with two DMRSs may be used as it is. That is, the number and pattern of DMRS transmissions may be differently configured according to a channel and a carrier frequency band.

In addition, since the TDM (Time Division Multiplexing) method used in D2D is not suitable for C-V2X in which a number of vehicles are densely connected and connected at the same time, the Frequency Division Multiplexing (FDM) method is used.

Figure 9:
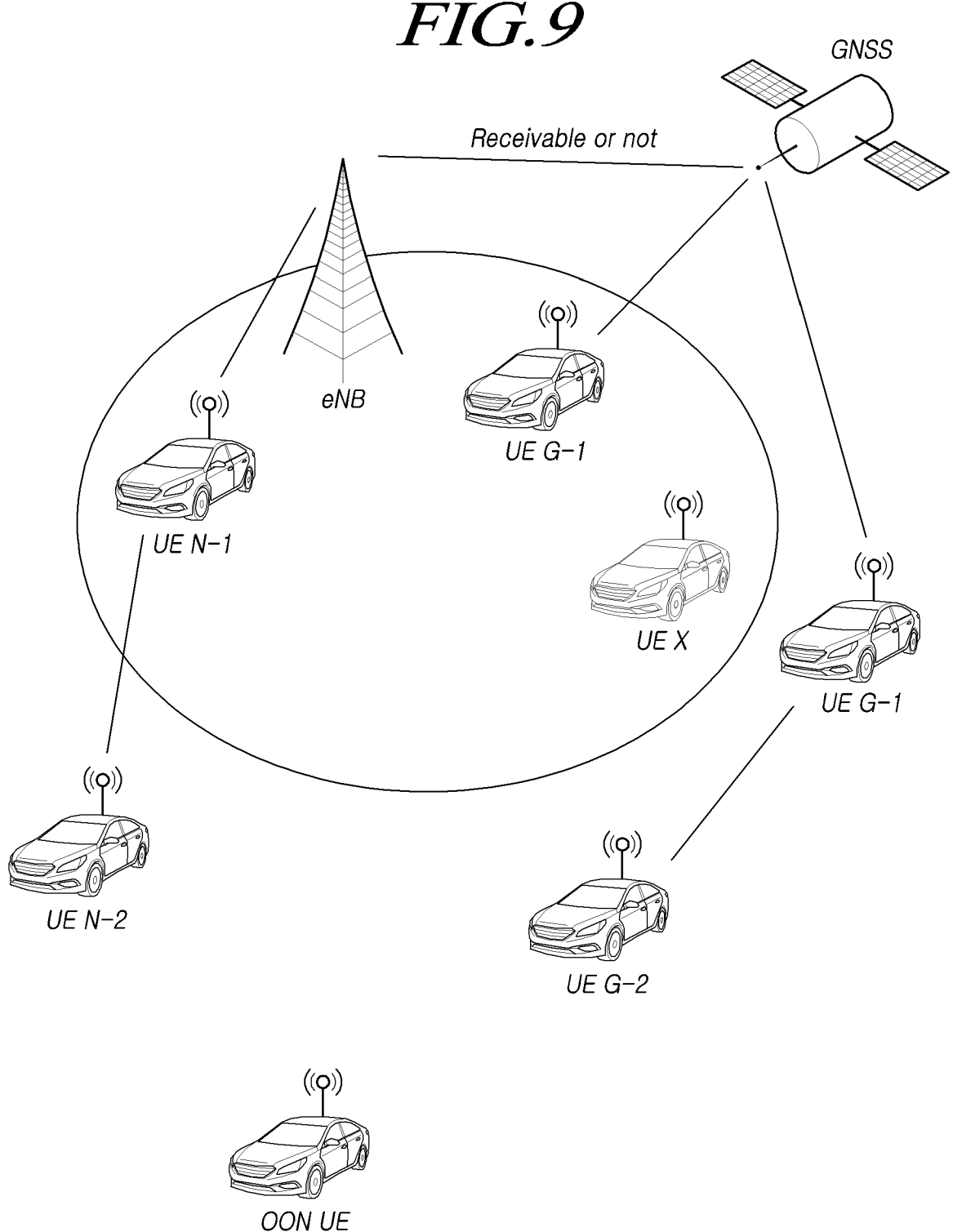
FIG. 9 is a diagram illustrating a variety of scenarios for V2X communications.

FIG. 9 is a diagram illustrating a variety of scenarios for V2X communications.

Referring to FIG. 9, V2X terminals may be located inside or outside of the coverage of a base station eNB (or gNB or ng-eNB). (Although the V2X terminals are illustrated as being vehicles, the V2X terminals may be a variety of devices, such as a user terminal.) For example, communications may be performed between terminals (UE N-1, UE G-1, and UE X) inside the coverage of the base station (or base station coverage) or between a terminal (e.g. UE G-1) inside the base station coverage and a terminal (e.g. UE N-2) outside of the base station coverage. In addition, communications may be performed between terminals (e.g. UE G-1 and UE G-2) outside of the base station coverage.

In such a variety of scenarios, the allocation of wireless resources for communications is required so that the corresponding terminal performs sidelink communications. The allocation of wireless resources is generally divided into an allocation method handled by the base station and an allocation method selected by the terminal.

Specifically, the method in which the terminal allocates resources in the D2D includes a method in which the base station intervenes in the selection and management of resources (Mode 1) and a method in which the terminal directly selects resources (Mode 2). Similar to the D2D, there are a method in which the base station intervenes in the selection and management of resources t in C-V2X (Mode 3) and a method in which a vehicle directly selects resources in V2X (Mode 4). In Mode 3, the base station performs scheduling of a transmitting terminal about a scheduling assignment (SA) pool resource domain and a DATA pool resource domain allocated thereto.

Figure 10A:
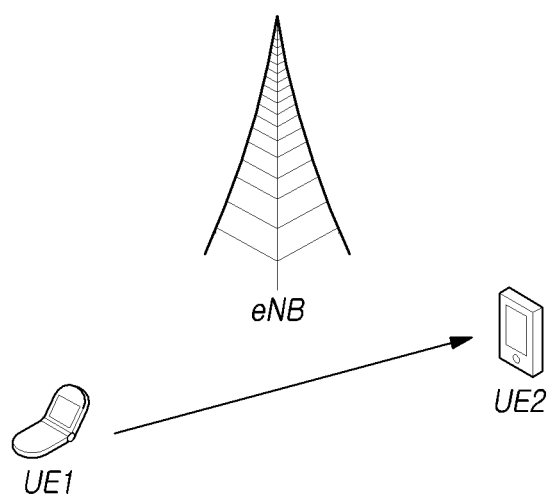
FIGS. 10A and 10B illustrate examples of terminal 1 (UE1) and terminal 2 (UE2) performing sidelink communications and examples of a sidelink resource pool used by the terminals.
Figure 10B:
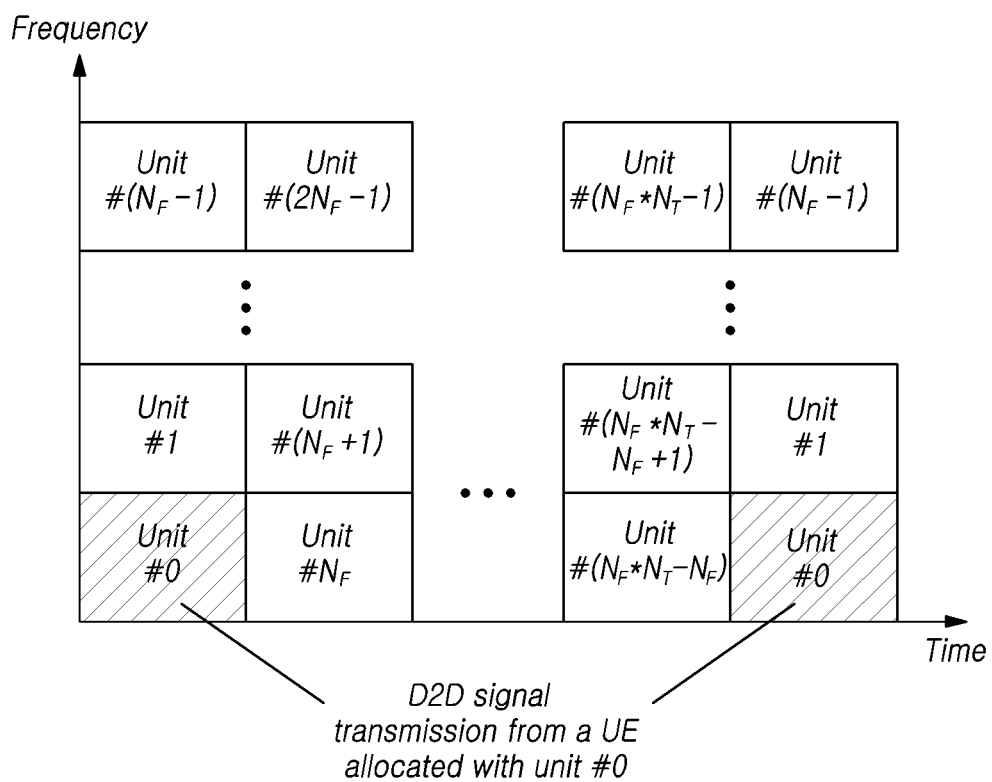

FIGS. 10A and 10B illustrate examples of terminals UE1 and UE2 performing sidelink communications and an example of a sidelink resource pool used by the terminals.

Referring to FIGS. 10A and 10B a base station is illustrated as being an eNB, but may be a gNB or an ng-eNB. In addition, the terminals are illustrated as being cellular phones, but may be applied to a variety of devices, such as a vehicle or an infrastructure device.

In FIG. 10A, the transmitting terminal UE1 may select a resource unit corresponding to a predetermined resource from a resource pool indicating a set of resources and transmit a sidelink signal using the corresponding resource unit. The receiving terminal UE2 may have the resource pool, which the transmitting terminal UE1 may transmit, configured therein and detect the signal transmitted by the transmitting terminal.

Here, when the terminal UE1 is inside the base station coverage, the resource pool may be informed by the base station. When the terminal UE1 is outside of the base station coverage, the resource pool may be informed by another terminal or may be determined to be a predetermined resource. In general, the resource pool is comprised of a plurality of resource units, and each terminal may select one or more resource units and use the selected resource units when transmitting sidelink signals.

Referring to FIG. 10B, it may be appreciated that a total of NFXNT number of resource units are defined, with entire frequency resources being divided into NF number of frequency resource units, and time resources being divided into NT number of time resource units. Here, the corresponding resource pool may be regarded as being repeated in a period of an NT subframe. In particular, as illustrated in the figures, a single resource unit may repeatedly appear in a periodic manner.

In addition, the resource pools may be divided into a plurality of types. First, the resource pools may be divided according to contents of sidelink signals transmitted by respective resource pools. For example, the contents of the sidelink signals may be divided, and separate resource pools may be configured therefor, respectively. The contents of the sidelink signals may include scheduling assignment (SA), a sidelink data channel, and a discovery channel.

The SA may be a signal including information regarding the position of a source that the transmitting terminal uses for the transmission of a subsequent sidelink data channel, a modulation and coding scheme (MCS) or multiple-input multiple-output (MIMO) transmission method required for the modulation of other data channels, timing advance (TA), and the like. This signal may be multiplexed and transmitted together with sidelink data on the same resource unit. In this case, the SA resource pool may refer to a pool of resources via which the SA is multiplexed and transmitted together with sidelink data.

In addition, a frequency division multiplexing (FDM) method used in V2X communications may reduce a delay time by which a data resource is applied after SA resource allocation. For example, a non-adjacent method by which control channel resources and data channel resources are divided on the time domain in a single subframe and an adjacent method by which control channel resources and data channel resources are consecutively allocated in a single subframe are considered.

In addition, in a case in which the SA is multiplexed and transmitted together with the sidelink data on the same resource unit, only the sidelink data channel, from which SA information is excluded may be transmitted in the resource pool for the sidelink data channel. In other words, resource elements that have been used to transmit the SA information on individual resource units in the SA resource pool may still be used in the sidelink data channel resource pool to transmit the sidelink data. The discovery channel may be a resource pool for a message with which the transmitting terminal transmits information, such as the ID thereof, thereby allowing an adjacent terminal to discover the transmitting terminal. Even in a case in which the contents of the sidelink signal are the same, different resource pools may be used according to transmission and reception properties of the sidelink signal.

For example, even the same sidelink data channels or the same discovery messages may be subdivided into different resource pools, according to how to determine a point in time at which the sidelink signal is transmitted (e.g. whether the sidelink signal is transmitted at a point in time at which a synchronization reference signal is received or at a point in time obtained by applying a predetermined TA to the point in time at which the synchronization reference signal is received), a resource allocation method (e.g. whether the base station designates transmission resources of individual signals to individual transmitting terminals or individual transmitting terminals directly select individual signal transmission resources within the pool), a signal format (e.g. the number of symbols that each sidelink signal occupies in a single subframe or the number of subframes used in the transmission of a single sidelink signal), the intensity of a signal from the base station, the intensity of transmission power of the sidelink terminal, and the like.

V2X Resource Pool (Sensing and Selection Windows)

The V2X terminal may perform message (or channel) transmission on a predefined (or signaled) resource pool. The resource pool may mean a predefined resource(s) so that the terminal performs a V2X operation (or a V2X operation is possible). In this case, the resource pool may be defined in terms of, for example, time-frequency. Meanwhile, various types of V2X transmission resource pools may exist.

Figure 11A:
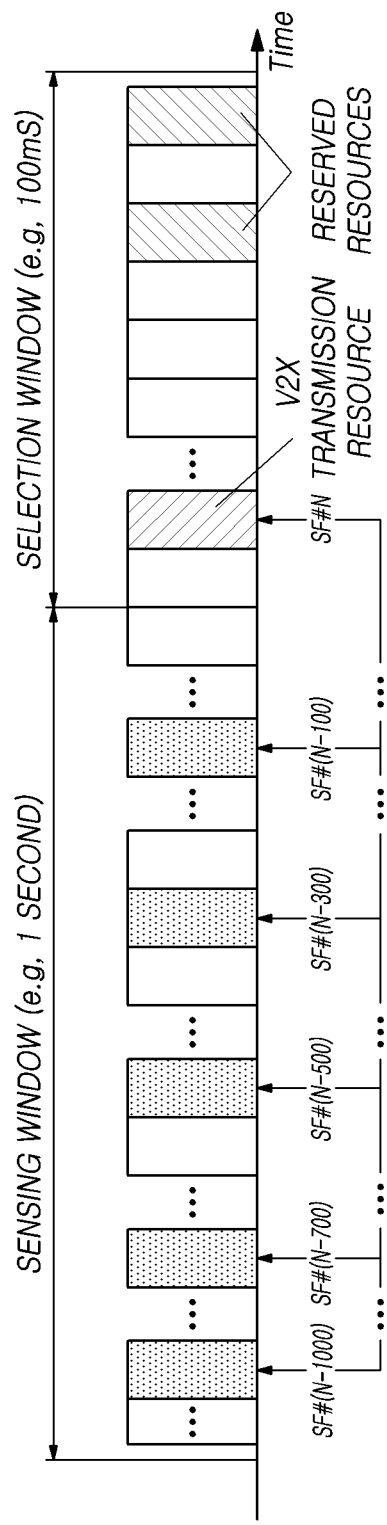

FIGS. 11A and 11B illustrate the type of a V2X transmission resource pools.

Referring to FIG. 11A, V2X transmission resource pool #A may be a resource pool in which only (partial) sensing is allowed. The V2X transmission resource selected by the (partial) sensing is semi-statically maintained at a certain period as shown in FIG. 11A.

Referring to FIG. 11B, V2X transmission resource pool #B may be a resource pool in which only random selection is allowed. In the V2X transmission resource pool #B, the terminal may randomly select a V2X transmission resource in a selection window without performing the (partial) sensing.

As an example, in a resource pool in which only the random selection is allowed, unlike a resource pool in which only the (partial) sensing is allowed, the selected resource may be configured (/signaling) so that the selected resource is not semi-statically reserved. The base station may be configured not to perform a sensing operation (based on scheduling allocation decoding/energy measurement) in order for the terminal to perform a V2X message transmission operation on the V2X transmission resource pool.

Meanwhile, although not shown in FIGS. 11A and 11B, a resource pool capable of both the (partial) sensing and the random selection may also exist. The base station may inform that the V2X resource may be selected by either of the partial sensing and the random selection.

In general, UL transmissions using a semi-persistent scheduling (SPS) may cause a slight delay when there is a significant gap between the generation of user data and a configured SPS resource. Thus, when the SPS is used in a traffic, such as a sidelink communication traffic, sensitive to a delay, an SPS scheduling interval must be small enough to be able to support delay requirements.

However, since the terminal UE may not be able to sufficiently use the configured SPS resource, a smaller SPS scheduling interval may lead to greater overhead. Thus, the gap between the generation of user data and the configured SPS resource must be insignificant, and the SPS scheduling interval must be appropriate to meet delay requirements. At present, there is no mechanism supporting this function.

Figure 12:
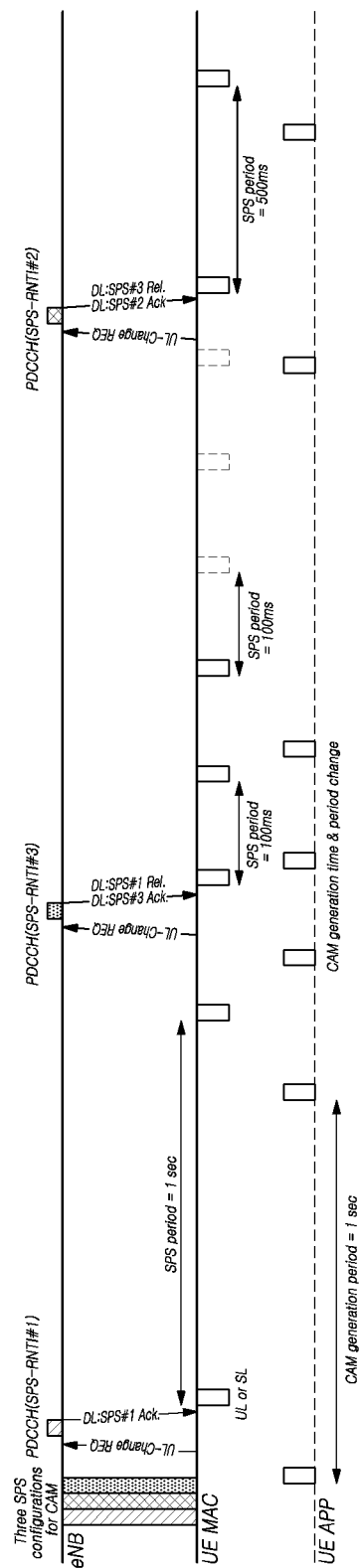
FIG. 12 illustrates a method of performing at least one of activation (request), reactivation (re-request), and release or change of a semi-persistent scheduling (SPS) triggered by the terminal UE.

FIG. 12 illustrates a method of performing at least one of activation (request), reactivation (re-request), and release or change of an SPS triggered by the terminal UE.

A terminal UE may receive an SPS configuration for at least one predetermined logic channel. The terminal UE may receive the SPS configuration for the predetermined logic channel via system information, an RRC connection configuration message, an RRC connection reconfiguration message, or an RRC connection release message.

When data for at least one predetermined logic channel is usable, the terminal may transmit an SPS activation request to an eNB and perform UL transmission using the configured SPS resource in response to an SPS activation command received from the eNB. The terminal UE may transmit the SPS activation request to the eNB through a physical uplink control channel (PUCCH), a MAC control element (CE), or an RRC message. That is, the terminal may transmit the SPS activation request to the eNB using a control resource used when requesting SPS activation. The control resource may be a PUCCH resource, a random access resource, or a new UL control channel resource. In addition, the terminal UE may transmit the SPS activation request to the eNB, for example, during RRC connection establishment or establishment, during handover, after handover, or at RRC CONNECTED.

In the presence of UL data to be transmitted, the terminal UE actively requests the SPS activation from the eNB. Thus, the gap between the generation of the UL data and the configured SPS resource may be reduced.

Referring to FIG. 12, the terminal UE receives SPS configuration information including three SPS configurations from the eNB. In the presence of UL data to be transmitted from a higher layer, the terminal transmits an SPS request message to the eNB through, for example, the MAC CE. The eNB sends an acknowledgement (ACK) message regarding one of the three SPS configurations. The terminal UE transmits UL data based on a predetermined resource, e.g. in a period of 1 sec, according to the corresponding SPS configuration.

In addition, in the presence of UL data to be transmitted from the higher layer at a predetermined point in time, the terminal UE retransmits the SPS request message to the eNB, for example, through the MAC CE. The eNB sends an acknowledgement message regarding another one of the three SPS configurations. The terminal UE transmits UL data through a predetermined resource, e.g. in a period of 100 sec, according to the corresponding SPS configuration.

Transmission and Reception of SA (Scheduling Assignment)

The mode 1 terminal may transmit an SA (or a sidelink control signal, sidelink control information (SCI)) through a resource configured from the base station. The mode 2 terminal is configured with resources to be used for sidelink transmission from the base station. Then, the SA may be transmitted by selecting a time frequency resource from the configured resource.

Figure 13:
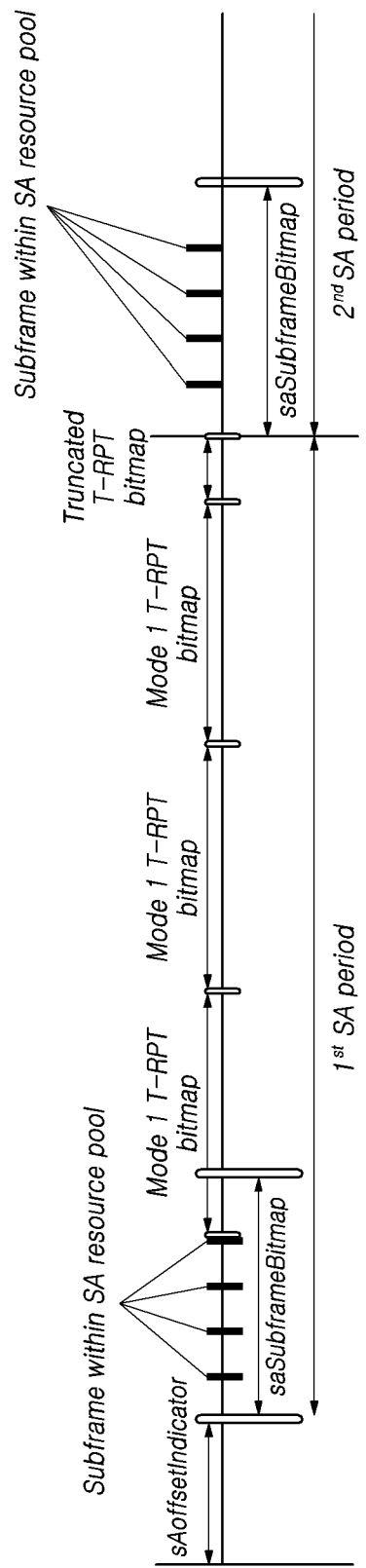
FIG. 13 illustrates a SA period.

The SA period may be defined as shown in FIG. 13. Referring to FIG. 13, a first SA period may start in a subframe separated by a predetermined offset (SAOffsetIndicator) indicated by higher layer signaling from a specific system frame. Each SA period may include an SA resource pool and a subframe pool for sidelink data transmission.

The SA resource pool may include the last subframe among subframes indicated by transmission of the SA in a subframe bitmap (saSubframeBitmap) from the first subframe of the SA period. As for the resource pool for the sidelink data transmission, in the case of mode 1, a subframe used for actual data transmission may be determined by applying a time-resource pattern for transmission (T-RPT) or a time-resource pattern (TRP). As shown, if the number of subframes included in the SA period excluding the SA resource pool is greater than the number of T-RPT bits, the T-RPT may be repeatedly applied, and the last applied T-RPT is the number of remaining subframes. It can be applied as truncated.

As described above, in the case of a V2X communication terminal, it is highly likely to be located outside the coverage of the base station. Even in this case, communication using the sidelink must be performed. In this regard, it is important that terminal located outside the coverage of a base station acquires synchronization.

Hereinafter, a method of determining time and frequency synchronization in sidelink communications, in particular, vehicle-to-vehicle communications, communications between a vehicle and another terminal, and communications between a vehicle and an infranetwork, will be described on the basis of the above description.

D2D communications have used a sidelink synchronization signal (SLSS), i.e. a synchronization signal that a base station transmits for time synchronization between terminals. In the C-V2X, the global navigation satellite system (GNSS) may be additionally considered in order to improve synchronization performance. However, priority may be imparted to synchronization establishment, or the base station may indicate information regarding priority. For example, when the terminal determines the transmission synchronization thereof, the terminal has highest priority in selecting a synchronization signal that the base station directly transmits. When the terminal is located outside of the base station coverage, the terminal has priority in synchronizing with the SLSS that a terminal inside the base station coverage.

In addition, a wireless terminal disposed in a vehicle or a terminal mounted on a vehicle has a less problem related to the consumption of the battery. In addition, since satellite signals, e.g. signals of the global positioning system (GPS), may be used for navigation, the satellite signals may be used for time or frequency synchronization between terminals. Here, the satellite signals may be signals of a global navigation satellite system (GNSS), such as GLONAS, Galileo, or BeiDou, in addition to the GPS.

In addition, the sidelink synchronization signals may include a sidelink primary synchronization signal (S-PSS) and a sideline secondary synchronization signal (S-SSS). The S-PSS may be a Zadoff-chu sequence having a predetermined length, a structure similar to, modified from, or obtained by repeating the PSS, or the like. In addition, unlike a DL PSS, a different Zadoff-chu root index (e.g. 26 or 37) may be used. The S-SSS may be an M-sequence, a structure similar to, modified from, or obtained by repeating the SSS, or the like. If the terminals obtain synchronization with the base station, an SRN is the base station, and a sidelink synchronization signal (SLSS) is a PSS/SSS.

Unlike the DL PSS/SSS, the S-PSS/S-SSS is compliant with a UL subcarrier mapping method. A physical sidelink broadcast channel (PSBCH) may be a channel through which system information, i.e. basic information that is the first thing which the terminal must be informed of, is transmitted before the transmission or reception of the sidelink signal. (Examples of the system information may include information regarding the SLSS, information regarding a duplex mode (DM), information regarding a TDD UL/DL configuration, information regarding the resource pool, types of applications related to the SLSS, subframe offset information, and broadcast information.) The PSBCH may be transmitted on a subframe the same as or subsequent to that of the SLSS. A demodulation reference signal (DMRS) may be mused for the demodulation of the PSBCH. The SLSS and the PSBCH may be described as being a sidelink synchronization signal block (S-SSB).

The SRN may be a node through which the SLSS and the PSBCH are transmitted. The SLSS may have a predetermined sequence type, while the PSBCH may be a sequence indicating predetermined information or a code word obtained after predetermined channel coding. Here, the SRN may be the base station or a predetermined sidelink terminal. In the case of a partial network coverage or out-of-network coverage, a terminal may be the SRN.

In addition, the SLSS may be relayed for sidelink communications with an out-of-coverage terminal as required or may be relayed by multi-hop relay. In the following description, relaying the synchronization signal refers to not only directly relaying the synchronization signal of the base station but also transmitting a sidelink synchronization signal having a separate format at a point in time at which the synchronization signal is received. Since the sidelink synchronization signal is relayed in this manner, a terminal inside the coverage and a terminal outside of the coverage may directly communicate with each other.

As described above, there is a demand for V2X technology based on NR in order to meet complicated requirements such as autonomous driving, unlike the V2X based on the LTE system.

In the NR V2X, the frame structure of NR, a numerology, a channel transmission and reception procedure, and the like are applied so that more flexible V2X services may be provided in a more variety of environments. In this regard, the development of a technology for sharing resources between the base station and the terminal, a sidelink carrier aggregation (CA) technology, a partial sensing technology for a pedestrian terminal, sTTI, and the like is required.

The NR V2X is designed to support not only broadcast used in the LTE V2X, but also unicast and group-cast. In this case, target group IDs are used for the group-cast and the unicast, but whether or not to use a source ID will be discussed later.

In addition, since the HARQ is to be supported for quality of service (QoS), the control information further includes an HARQ process ID. In the LTE HARQ, the PUCCH for the HARQ is transmitted after four subframes after downlink transmission. In contrast, in the NR HARQ, feedback timing, e.g. PUCCH resources and feedback timing, may be indicated using a PUCCH resource indicator or an HARQ feedback timing indicator regarding the PDSCH in DCI format 1_0 or 1_1.

The NR V2X sidelink synchronization includes sidelink synchronization signal(s) and PSBCH, and the sidelink source may include the terminal UE together with the GNSS and the gNB.

In NR V2X sidelink communication, at least two sidelink resource allocation modes, that is, mode 3 and mode 4 may be defined. In the mode 3, the base station schedules sidelink resource(s) used by the terminal UE for sidelink transmission. In the mode 4, the terminal UE determines sidelink transmission resource(s) within sidelink resources configured by the base station or preconfigured sidelink resources.

The mode 4 may cover the following resource allocation sub-modes. That is, the terminal UE may automatically selects a sidelink resource for transmission, help to select a sidelink resource for other UE(s), or consist of a grant configured for sidelink transmission, or schedule a sidelink transmission of another terminal(s).

NR Uu may allocate NR sidelink resources for a licensed carrier and/or a dedicated NR sidelink carrier shared between Uu and the NR sidelink. In this case, resource allocation may support dynamic resource allocation and activation/deactivation-based resource allocation. The activation/deactivation-based resource allocation may reuse SPS allocation or NR grant free type-2.

In the following, SLSS id_net is a set of SLSS IDs selected from among physical layer SLSS IDs {0, 1, . . . , and 335}, used by terminals that have selected the synchronization signal of the base station as a synchronization reference. SLSS id_net may be {0, 1, . . . , and 167}. In addition, SLSS id_oon is a set of SLSS IDs that terminals outside of the base station coverage use when directly transmitting a synchronization signal. SLSS id_oon may be {168, 169, . . . , and 335}.

In the following, the GNSS and the GPS as examples of satellite signals are mainly used, but these may be replaced with other satellite signals. In addition, V (vehicle)-UE may be a vehicle, and P (pedestrian)-UE may be a terminal moving by foot or a terminal moving by cycle. In addition, the GPS timing may configure a frame/subframe boundary based on an absolute time called the time acquired at the time of GPS reception (for example, UTC: Coordinated Universal Time or GPS time), and some or all of the subframes may mean that is configured as a subframe for sidelink signal transmission FIGS. 14A and 14B are diagrams for explaining a time division multiple access structure and a frequency division multiple access structure.

Figure 14A:
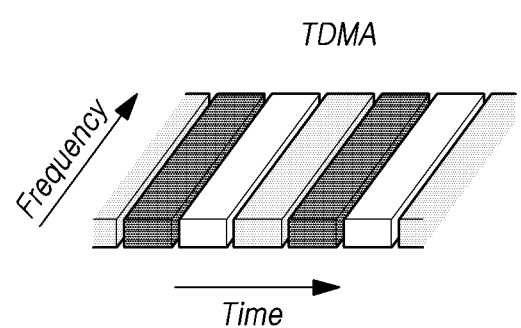
FIGS. 14A and 14B are diagrams for explaining a time division multiple access structure and a frequency division multiple access structure.
Figure 14B:
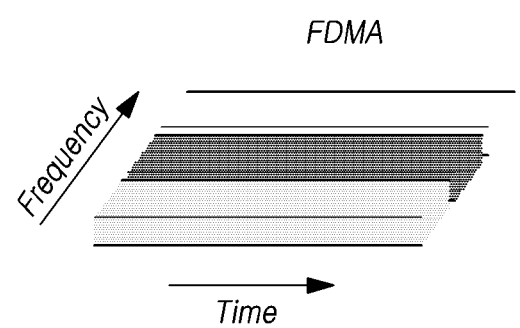

Referring to FIGS. 14A and 14B, a multiplexing structure is essentially required for efficient use of radio resources in sidelink communication. In communication and computer networks, multiplexing is a method in which multiple analog or digital signals are combined into one signal through a shared medium. Through this, scarce resources may be used efficiently. For example, in the communication, multiple data communications may be performed using one radio path.

The multiplexed signal is transmitted through a communication channel. Multiplexing divides the capacity of the communication channel into multiple logical channels, one for each message signal or data stream. An inverse process known as demultiplexing extracts the original channel at the receiver end. For example, a device that performs the multiplexing is called a multiplexer (MUX), and a device that performs the reverse process is called a demultiplexer (DEMUX or DMX).

FIG. 14A shows the multiplexing of the time division type. Time division multiplexing (TDM) is a digital (or in rare case analog) technique that uses time instead of space or frequency to separate different data streams. The TDM entails sequencing several bits or groups of bytes in each individual input stream in turn and in such a way that they may be associated with the appropriate receiver.

FIG. 14B shows the multiplexing of frequency division type. Frequency division multiplexing (FDM) is essentially an analog technique. The FDM combines multiple signals into one medium by sending signals over a single medium in several distinct frequency ranges. One of the most common applications of the FDM is traditional radio and television broadcasts from terrestrial, mobile or satellite stations or cable television. Although only one cable reaches the customer's area of residence, the service provider may transmit multiple television channels or signals simultaneously to multiple subscribers over that cable. To access the desired signal, the receiver must be tuned to the appropriate frequency.

In addition, technologies such as code division exist as data multiplex technologies.

Meanwhile, in LTE V2X, one scheduling assignment (SA) is related to one data transmission, and the SA and data are multiplexed into frequencies in a subframe. FDM multiplexing of the SA and the data enables the terminal UE to receive the SA more clearly. Therefore, it is helpful to improve the control channel stability. However, in order to receive all the control information, the receiving terminal may monitor all control channels transmitted in one subframe, and monitor data information of the data channel using a result of decoding the control information. This means that the decoding time of the control channel takes at least a subframe or more in time.

NR V2X has stricter time requirements than LTE V2X. That is, in a situation where fast response performance and fast data processing speed are required, such as URLLC, as described above, the multiplexing method of the LTE V2X has a disadvantage.

In order to solve this problem, multiplexing of the TDM scheme may be considered. That is, since the time division multiplexed SA and data structure may be processed as soon as all SA symbols of the SA are received, decoding time is reduced. However, in this case, efficient use of radio resources may be limited.

Therefore, each multiplexing structure needs to work well in different use cases to meet different requirements.

In the present disclosure, it is intended to more efficiently design a multiplexing structure of control information (SA) and data information in the NR V2X. Hereinafter, a link for vehicle communication will be described as a sidelink, and a channel through which the control information is transmitted will be described as a sidelink control channel or PSCCH. Similarly, a channel through which the data information is transmitted is described as a sidelink data channel or PSSCH.

Figure 15:
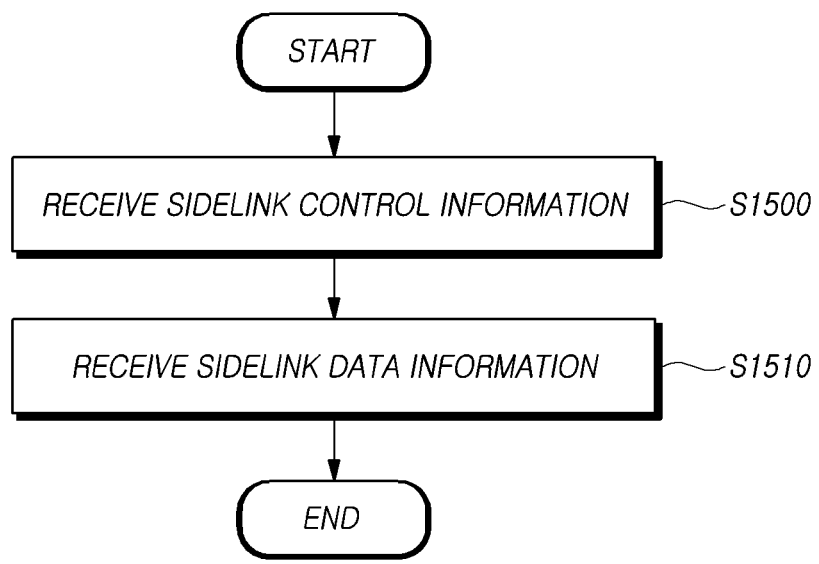
FIG. 15 is a diagram illustrating operations of a terminal according to an embodiment.

FIG. 15 is a diagram illustrating operations of a terminal according to an embodiment.

Referring to FIG. 15, a terminal performing a vehicle communication receives sidelink control information transmitted from other terminal through a sidelink control channel at S1500.

For example, the sidelink control information may include the aforementioned SA. In addition, the sidelink control information may include location information of the other terminal. In the case of the NR V2X, unlike the LTE V2X, since it aims for high reliability data transmission, it may be necessary to transmit HARQ ACK/NACK for data transmitted/received through a sidelink. In addition, the NR V2X supports unicast and group cast operations as well as data transmission and reception in the related art broadcast method.

However, the sidelink is a communication between a terminal and the other terminal, and frequent transmission and reception of response information such as HARQ ACK/NACK may rapidly increase the overhead of radio resources.

Therefore, the terminal according to an embodiment calculates the distance information between the other terminal and the terminal using the location information of the other terminal included in the sidelink control information, and determines whether to transmit the response information based on distance information between the other terminal and the terminal.

For example, when the other terminal transmits specific data in a group cast method, the terminal checks the location information of the other terminal through the sidelink control information. Thereafter, the terminal calculates distance information between the terminal and the other terminal by using its own location information and the received location information of the other terminal. If the distance information is less than the preconfigured reference distance, the terminal does not transmit the response information, and may transmit the response information only when it is greater than the reference distance. This is a technology for reducing system overhead by taking advantage of the high probability of successful data arrival in the case of a terminal located within a certain distance. The location information may be GNSS information of the other terminal, and there is no limitation.

The terminal receives sidelink data information transmitted by the other terminal on a sidelink data channel configured in the same slot based on the sidelink control information at S1510.

That is, the sidelink control information and the sidelink data information may be received within one slot, and are multiplexed and received.

For example, the sidelink control information and the sidelink data information may be received in N same symbols among 14 symbols constituting the same slot, and the sidelink data information is received in all of the 14 symbols. That is, when one slot is composed of 14 symbols, the sidelink control information and the sidelink data information may be multiplexed and received in the frequency axis in the N symbols wherein N is a natural number less than 14. In addition, the sidelink data information may be received in all of 14 symbols constituting one slot.

The N same symbols in which both the sidelink control information and the sidelink data information are received are symbols allocated from symbol indexes 0 to N-1. That is, when symbol indexes 0 to 13 are mapped 1:1 to 14 symbols on the time axis, both the sidelink control information and the sidelink data information may be received in symbols from symbol indexes 0 to N-1. Accordingly, on the time axis, both the sidelink control information and the sidelink data information are received in the first N symbols of the slot, and only the sidelink data information is received in the next 14-N symbols.

Frequency bands in which the sidelink control information and the sidelink data information are received in the N same symbols are different or differently distinguished from each other. That is, the sidelink control information and the sidelink data information in the N symbols may be received in the FDM scheme.

For example, the sidelink control information is received through some frequency bands of the frequency bands allocated in the same symbol, and the sidelink data information is received in a frequency band other than some of the frequency bands in the allocated frequency bands. Specifically, when the allocated frequency bands are from X Hz to Y Hz, some of frequency bands may be allocated from K Hz to Z Hz. K may be a number greater than X, and Z may be a number less than Y, and X, Y, K, Z may be a natural number.

The structure of the sidelink control channel and the sidelink data channel through which the above-described sidelink control information and sidelink data information are received will be described again with reference to the drawings below.

Figure 16:
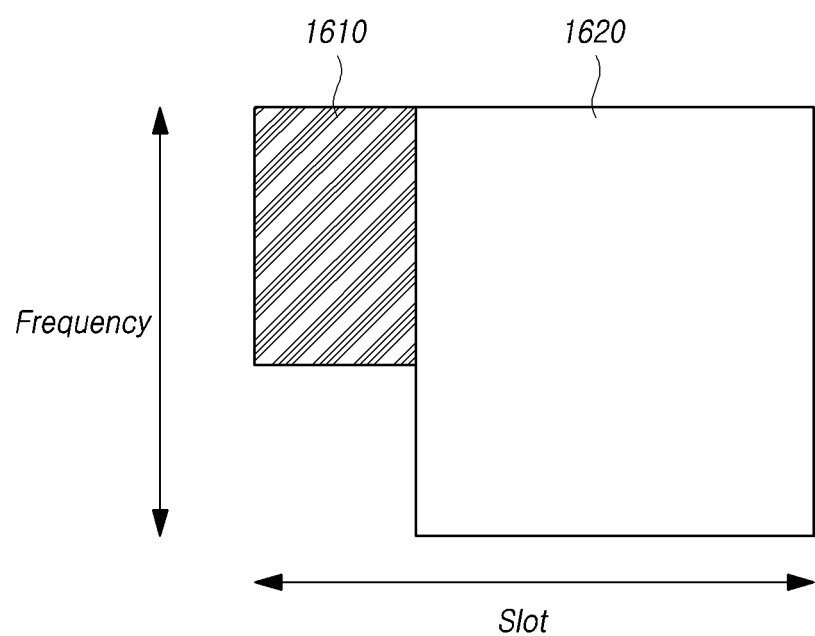
FIG. 16 is a diagram illustrating a structure of a sidelink control channel and a sidelink data channel in one slot according to the other embodiment.

FIG. 16 is a diagram illustrating a structure of a sidelink control channel and a sidelink data channel in one slot according to the other embodiment.

Referring to FIG. 16, the sidelink control channel 1610 may be configured in the first N symbols in one slot. The sidelink data channel 1620 may be configured with 14-N symbols in one slot. As shown in FIG. 16, the sidelink control channel 1610 and the sidelink data channel 1620 may be overlapped with each other on the frequency axis, but their symbols are completely different from each other so that the same symbol overlapping for them may not exist.

However, the sidelink control channel 1610 may be configured only in some of the allocated frequency bands, and neither the sidelink control channel 1610 nor the sidelink data channel 1620 may be configured for the remaining frequency bands.

Figure 17:
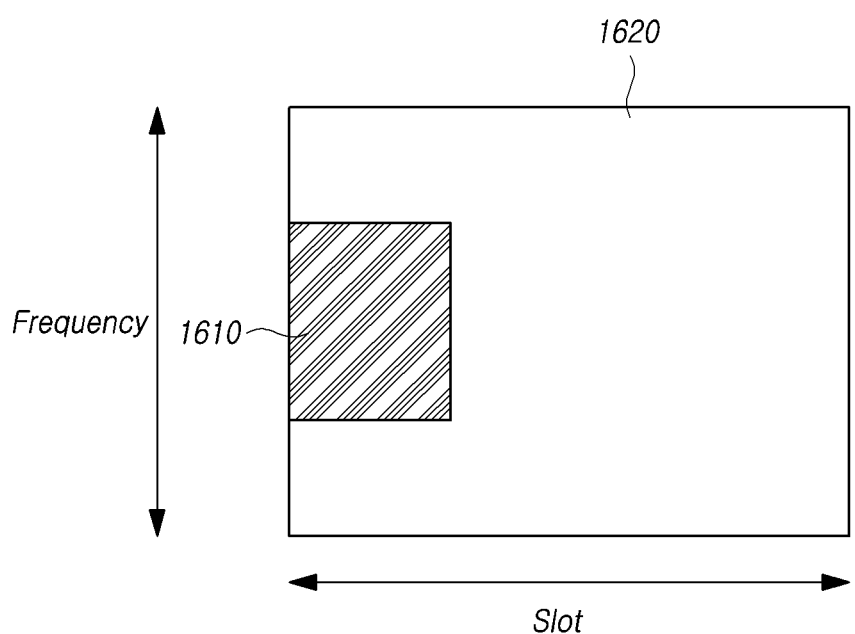
FIG. 17 is a diagram illustrating a structure of a sidelink control channel and a sidelink data channel in one slot according to another embodiment.

FIG. 17 is a diagram illustrating a structure of a sidelink control channel and a sidelink data channel in one slot according to another embodiment.

Referring to FIG. 17, the sidelink control channel 1610 and the sidelink data channel 1620 may be multiplexed in the same symbol using the FDM scheme. As shown in FIG. 17, both the sidelink control channel 1610 and the sidelink data channel 1620 may be configured in the first N symbols in one slot, and may be different or differently distinguished from each other on a frequency axis.

In addition, only the sidelink data channel 1620 may be allocated to the remaining symbols in one slot except for N symbols.

In addition, the sidelink control channel 1610 may be composed of N symbols, and may be located in the center of the sidelink data channel 1620 on the frequency axis. That is, the sidelink data channel 1620 may be configured both above and below the sidelink control channel 1610.

Through this structure, the terminal obtains the sidelink control information by decoding it quickly, and at the same time, when there is not much sidelink control information, the terminal receives the sidelink data information from the same symbol so that it may efficiently use the radio resources.

In addition to this, the present disclosure may multiplex the sidelink control channel and the sidelink data channel in a method of dividing and using a resource with respect to time similar to the TDM scheme and sharing a frequency.

For example, similarly to the related art TDMA, the same frequency may be used and the radio resources of scheduling assignment (SA) and data may be allocated depending on time. In this case, both the SA and the data are not received within the same symbol.

As another example, the scheduling assignment with relatively little resource usage uses only some of the frequency bands and its radio resource may be depending on time. That is, it may be configured similarly to the FDM scheme.

In another embodiment, the scheduling assignment uses some of the frequency bands, but a frequency band that is not used may be configured so that the data may be used, which is similar to the structure of FIG. 17.

As another example, a method of dividing and using resources for each frequency in the same manner as FDMA and sharing time may be considered. For example, as with the related art FDMA, the scheduling assignment and the data are allocated by using the same time and dividing the frequency. Alternatively, although the FDMA method is used, the scheduling assignment may be configured to receive only a required amount of time. Alternatively, data transmission may be allocated for a time other than the time allocated for the scheduling assignment.

Figure 18:
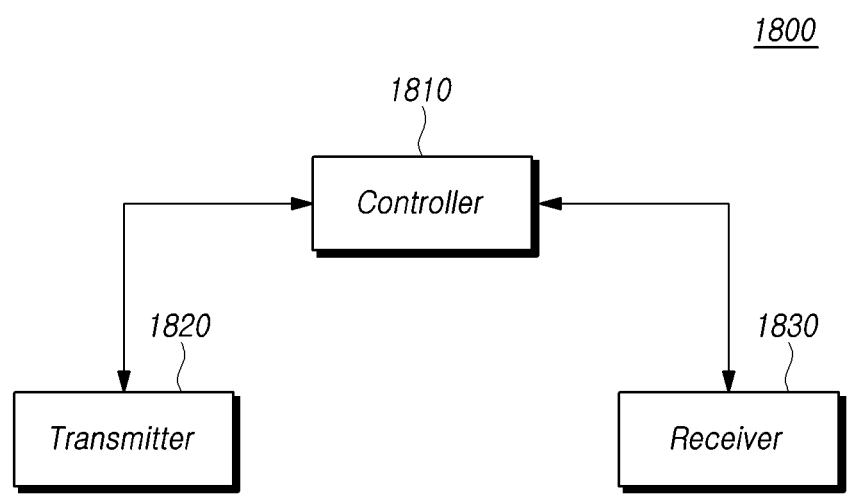
FIG. 18 is a diagram illustrating a configuration of a terminal according to further another embodiment.

FIG. 18 is a diagram illustrating a configuration of a terminal according to further another embodiment.

Referring to FIG. 18, a terminal 1800 performing a vehicle communication may include a receiver 1830 and a controller 1810. The receiver 1830 receives sidelink control information transmitted from other terminal through a sidelink control channel, and sidelink data information transmitted by the other terminal on a sidelink data channel configured in the same slot based on the sidelink control information. The controller 1810 decodes the sidelink control information and the sidelink data information. The terminal 1800 may further include a transmitter 1820 transmits response information indicating whether or not the sidelink data information is normally received, to the other terminal. The sidelink control information and the sidelink data information are received in N same symbols among 14 symbols constituting the same slot, and the sidelink data information is received in all of the 14 symbols.

For example, the sidelink control information may include the aforementioned SA. In addition, the sidelink control information may include location information of the other terminal. In the case of the NR V2X, unlike the LTE V2X, since it aims for high reliability data transmission, it may be necessary to transmit HARQ ACK/NACK for data transmitted/received through a sidelink. In addition, the NR V2X supports unicast and group cast operations as well as data transmission and reception in the related art broadcast method. However, the sidelink is a communication between a terminal and the other terminal, and frequent transmission and reception of response information such as HARQ ACK/NACK may rapidly increase the overhead of radio resources.

Therefore, the controller 1810 according to an embodiment may calculate the distance information between the other terminal and the terminal using the location information of the other terminal included in the sidelink control information, and determine whether to transmit the response information based on distance information between the other terminal and the terminal.

For example, when the other terminal transmits specific data in a group cast method, the controller 1810 checks the location information of the other terminal through the sidelink control information. Thereafter, the controller 1810 calculates distance information between the terminal and the other terminal by using its own location information and the received location information of the other terminal. If the distance information is less than the preconfigured reference distance, the controller 1810 does not transmit the response information, and may transmit the response information only when it is greater than the reference distance. This is a technology for reducing system overhead by taking advantage of the high probability of successful data arrival in the case of the terminal 1800 located within a certain distance. The location information may be GNSS information of the other terminal, and there is no limitation.

The sidelink control information and the sidelink data information may be received within one slot, and are multiplexed and received. For example, the sidelink control information and the sidelink data information may be received in N same symbols among 14 symbols constituting the same slot, and the sidelink data information is received in all of the 14 symbols. That is, when one slot is composed of 14 symbols, the sidelink control information and the sidelink data information may be multiplexed and received in the frequency axis in the N symbols wherein N is a natural number less than 14. In addition, the sidelink data information may be received in all of 14 symbols constituting one slot.

The N same symbols in which both the sidelink control information and the sidelink data information are received are symbols allocated from symbol indexes 0 to N-1. That is, when symbol indexes 0 to 13 are mapped 1:1 to 14 symbols on the time axis, both the sidelink control information and the sidelink data information may be received in symbols from symbol indexes 0 to N-1. Accordingly, on the time axis, both the sidelink control information and the sidelink data information are received in the first N symbols of the slot, and only the sidelink data information is received in the next 14-N symbols.

Frequency bands in which the sidelink control information and the sidelink data information are received in the N same symbols are different or differently distinguished from each other. That is, the sidelink control information and the sidelink data information in the N symbols may be received in the FDM scheme.

For example, the sidelink control information is received through some frequency bands of the frequency bands allocated in the same symbol, and the sidelink data information is received in a frequency band other than some of the frequency bands in the allocated frequency bands. Specifically, when the allocated frequency bands are from X Hz to Y Hz, some of frequency bands may be allocated from K Hz to Z Hz. K may be a number greater than X, and Z may be a number less than Y, and X, Y, K, Z may be a natural number.

In addition, a transmitter 1820 and the receiver 1830 serve to transmit and receive signals, data, and messages to and from the base station and other terminals through corresponding channels.

In addition, the controller 1810 may control the operations of the terminal 1800 required for performing the foregoing embodiments.

Embodiments of the present disclosure may be supported by standard documents of at least one of the IEEE 802 system, the 3GPP system, and the 3GPP2 system, all of which are wireless access systems. That is, steps, components, or portions not described in embodiments of the present disclosure for the sake of clearly describing the spirit of the present disclosure may be supported by the standard documents. For all terms used herein, reference may be made to the standard documents.

Embodiments of the present disclosure may be implemented using a variety of means. For example, embodiments of the present disclosure may be implemented using hardware, firmware, software, or any combination thereof.

In the case in which the present disclosure is implemented using hardware, the methods according to embodiments of the present disclosure may be realized using one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present disclosure is implemented using firmware or software, the methods according to embodiments of the present disclosure may be implemented in the form of devices, processes, functions, or the like performing the functions or operations described above. Software codes may be stored in a memory unit so as to be executed by a processor. The memory unit may be located inside or outside of the processor and may exchange data with the processor via a variety of known means.

The terms, such as "system", "processor", "controller", "component", "module", "interface", "model", or "unit", used herein may generally refer to computer-related entity hardware, a combination of hardware and software, software, or software in execution. For example, the above-described components may be at least one selected from among, but not limited to, a process, a processor, a controller, a control processor, an entity, an execution thread, a program, and a computer. For example, both an application being executed by the controller or processor and the controller or processor may be a component. One or more components may reside in at least one of a process and an execution thread. A component may be located in a single device (e.g. a system or a computing device) or may be distributed to two or more devices.

The foregoing descriptions have been presented in order to explain certain principles of the present disclosure by way of example. Those having ordinary knowledge in the technical field to which the present disclosure relates could make various modifications and variations without departing from the essential features of the principle of the present disclosure. In addition, the foregoing embodiments shall be interpreted as being illustrative, while not being limitative, of the principle and scope of the present disclosure. It should be understood that the scope of protection of the present disclosure shall be defined by the appended Claims and all of their equivalents fall within the scope of protection of the present disclosure.

The invention claimed is:

1. A method of performing a vehicle communication by a terminal, the method comprising:
   receiving sidelink control information transmitted from other terminal through a sidelink control channel;
   receiving sidelink data information transmitted by the other terminal on a sidelink data channel configured in the same slot based on the sidelink control information; and
   transmitting response information indicating whether or not the sidelink data information is normally received, to the other terminal,
   wherein the sidelink control information and the sidelink data information are received in N same symbols among 14 symbols constituting the same slot, and the sidelink data information is received in all of the 14 symbols,
   wherein in case of the sidelink data information is group cast type, there is determined whether to transmit the response information based on distance information between the other terminal and the terminal,
   wherein the sidelink control information comprises location information of the other terminal.

2. The method according to claim 1, wherein the N same symbols in which both the sidelink control information and the sidelink data information are received are symbols allocated from symbol indexes 0 to N−1.

3. The method according to claim 2, wherein frequency bands in which the sidelink control information and the sidelink data information are received in the N same symbols are different from each other.

4. The method according to claim 1, wherein the sidelink control information is received through some frequency bands of the frequency bands allocated in the same symbol, and the sidelink data information is received in a frequency band other than some of the frequency bands in the allocated frequency bands.

5. The method according to claim 4, wherein, when the allocated frequency bands are from X Hz to Y Hz, some of frequency bands are allocated from K Hz to Z Hz,
   wherein K is a number greater than X, and Z is a number less than Y, and X, Y, K, Z is a natural number.

6. The method according to claim 1, wherein the distance information between the other terminal and the terminal is calculated based on the location information of the other terminal.

7. A terminal performing a vehicle communication, the terminal comprising:
   a receiver receiving sidelink control information transmitted from other terminal through a sidelink control channel, and sidelink data information transmitted by the other terminal on a sidelink data channel configured in the same slot based on the sidelink control information;
   a controller decoding the sidelink control information and the sidelink data information; and
   a transmitter transmitting response information indicating whether or not the sidelink data information is normally received, to the other terminal,
   wherein the sidelink control information and the sidelink data information are received in N same symbols among 14 symbols constituting the same slot, and the sidelink data information is received in all of the 14 symbols,
   wherein in case of the sidelink data information is group cast type, the controller determines whether to transmit the response information based on distance information between the other terminal and the terminal,
   wherein, the sidelink control information comprises location information of the other terminal.

8. The terminal according to claim 7, wherein the N same symbols in which both the sidelink control information and the sidelink data information are received are symbols allocated from symbol indexes 0 to N−1.

9. The terminal according to claim 8, wherein frequency bands in which the sidelink control information and the sidelink data information are received in the N same symbols are different from each other.

10. The terminal according to claim 7, wherein the sidelink control information is received through some frequency bands of the frequency bands allocated in the same symbol, and the sidelink data information is received in a frequency band other than some of the frequency bands in the allocated frequency bands.

11. The terminal according to claim 10, wherein, when the allocated frequency bands are from X Hz to Y Hz, some of frequency bands are allocated from K Hz to Z Hz,
   wherein K is a number greater than X, and Z is a number less than Y, and X, Y, K, Z is a natural number.

12. The terminal according to claim 7, wherein the distance information between the other terminal and the terminal is calculated based on the location information of the other terminal.

* * * * *